(12) United States Patent
Kim et al.

(10) Patent No.: US 11,400,404 B2
(45) Date of Patent: Aug. 2, 2022

(54) TERMINAL APPARATUS AND METHOD OF TRANSMITTING CONTROL COMMAND TO AIR CLEANING APPARATUS USING AIR POLLUTION INFORMATION ACQUIRED WHILE A MOVING CLEANING APPARATUS MOVES

(71) Applicant: Samsung Electronics Co., Ltd., Gyeonggi-do (KR)

(72) Inventors: Jaehong Kim, Gyeonggi-do (KR); Sangkyung Lee, Gyeonggi-do (KR); Iksoo Kim, Gyeonggi-do (KR)

(73) Assignee: Samsung Electronics Co., Ltd

( * ) Notice: Subject to any disclaimer, the term of this patent is extended or adjusted under 35 U.S.C. 154(b) by 77 days.

(21) Appl. No.: 16/412,920

(22) Filed: May 15, 2019

(65) Prior Publication Data

US 2019/0381443 A1 Dec. 19, 2019

Related U.S. Application Data

(60) Provisional application No. 62/685,549, filed on Jun. 15, 2018.

(30) Foreign Application Priority Data

Nov. 26, 2018 (KR) .......................... 10-2018-0147681

(51) Int. Cl.
*B01D 46/44* (2006.01)
*B01D 46/42* (2006.01)
(Continued)

(52) U.S. Cl.
CPC ......... *B01D 46/442* (2013.01); *B01D 46/429* (2013.01); *B01D 46/46* (2013.01);
(Continued)

(58) Field of Classification Search
CPC .... B01D 46/442; B01D 46/429; B01D 46/46; B01D 2279/40; B01D 2279/50;
(Continued)

(56) References Cited

U.S. PATENT DOCUMENTS 10,248,086 B2 4/2019 Lee et al.
10,525,458 B2 1/2020 Ono et al.
(Continued)

FOREIGN PATENT DOCUMENTS

CN 2015119245 3/2016
CN 106352457 1/2017
(Continued)

OTHER PUBLICATIONS

International Search Report dated Aug. 14, 2019 issued in counterpart application No. PCT/KR2019/005084, 12 pages.
(Continued)

*Primary Examiner* — Kenneth M Lo
*Assistant Examiner* — Jonathan Michael Skrzycki
(74) *Attorney, Agent, or Firm* — The Farrell Law Firm, P.C.

(57) ABSTRACT

Provided are a method of transmitting a control command of a terminal apparatus, a terminal apparatus, and a computer program product. The method includes storing position information of at least one air cleaning apparatus in an indoor space; acquiring region-by-region air pollution information of the indoor space acquired while a moving cleaning apparatus moves in the indoor space; acquiring, based on the acquired region-by-region air pollution information of the indoor space and the position information of the at least one air cleaning apparatus in the indoor space, a control command for controlling an operation of the at least one air cleaning apparatus to supply clean air to a polluted region among regions of the indoor space; and transmitting the (Continued)

acquired control command to the at least one air cleaning apparatus.

18 Claims, 18 Drawing Sheets

(51) Int. Cl.
  *B01D 46/46* (2006.01)
  *G05B 19/042* (2006.01)
  *F24F 11/57* (2018.01)

(52) U.S. Cl.
  CPC ............ *F24F 11/57* (2018.01); *G05B 19/042* (2013.01); *B01D 2279/40* (2013.01); *B01D 2279/50* (2013.01); *G05B 2219/2614* (2013.01)

(58) Field of Classification Search
  CPC ........ F24F 11/57; F24F 11/56; F24F 2221/42; F24F 11/70; F24F 2110/50; F24F 2130/00; F24F 2120/20; F24F 11/50; F24F 3/16; G05B 19/042; G05B 2219/2614
  See application file for complete search history.

(56) References Cited

U.S. PATENT DOCUMENTS

| | | | |
|---|---|---|---|
| 2006/0064204 A1 | 3/2006 | Kim et al. | |
| 2012/0180655 A1* | 7/2012 | Law | F24F 13/20 95/1 |
| 2014/0207281 A1* | 7/2014 | Angle | H04L 12/282 700/257 |
| 2016/0278593 A1 | 9/2016 | Lee et al. | |
| 2018/0021942 A1 | 1/2018 | Hummel | |
| 2018/0055312 A1 | 3/2018 | Jung | |
| 2018/0214861 A1* | 8/2018 | Ono | F24F 3/161 |
| 2019/0032932 A1* | 1/2019 | Xing | B01D 46/4263 |

FOREIGN PATENT DOCUMENTS

| | | | | |
|---|---|---|---|---|
| CN | 106813357 | 6/2017 | | |
| CN | 106813361 | 6/2017 | | |
| CN | 107073467 | 8/2017 | | |
| CN | 107192041 | 9/2017 | | |
| CN | 107702267 | 2/2018 | | |
| EP | 3 196 726 | 7/2017 | | |
| KR | 1020090030119 | 3/2009 | | |
| KR | 1020120090413 | 8/2012 | | |
| KR | 1020140111094 | 9/2014 | | |
| KR | 10-2017-0031809 | * | 9/2015 | ............ G06F 3/01 |
| KR | 10-1590343 | 1/2016 | | |
| KR | 10-2017-0080894 | 7/2017 | | |
| KR | 1020170086246 | 7/2017 | | |
| KR | 1020170088649 | 8/2017 | | |
| KR | 20180040977 | * | 4/2018 | ............ G01N 15/08 |
| WO | WO 96/29100 | 9/1996 | | |
| WO | WO 2016/079777 | 5/2016 | | |
| WO | WO 2016/133320 | 8/2016 | | |
| WO | WO 2017/018694 | 2/2017 | | |

OTHER PUBLICATIONS

European Search Report dated Oct. 15, 2019 issued in counterpart application No. 19174642.9-1008, 12 pages.
European Search Report dated Aug. 5, 2021 issued in counterpart application No. 19174642.9-1002, 10 pages.
Chinese Office Action dated May 7, 2022 issued in counterpart application No. 201980040131.3, 26 pages.

* cited by examiner

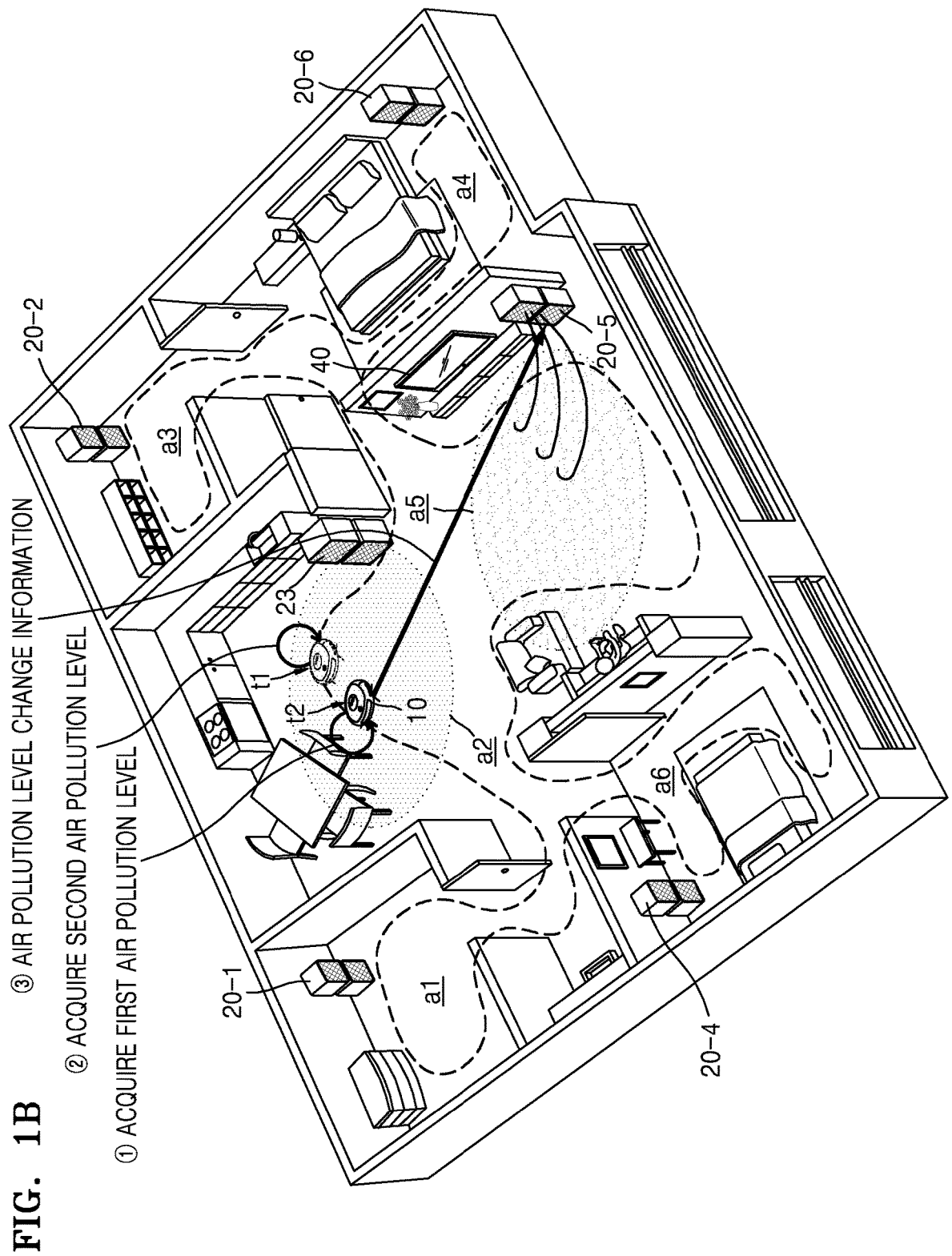

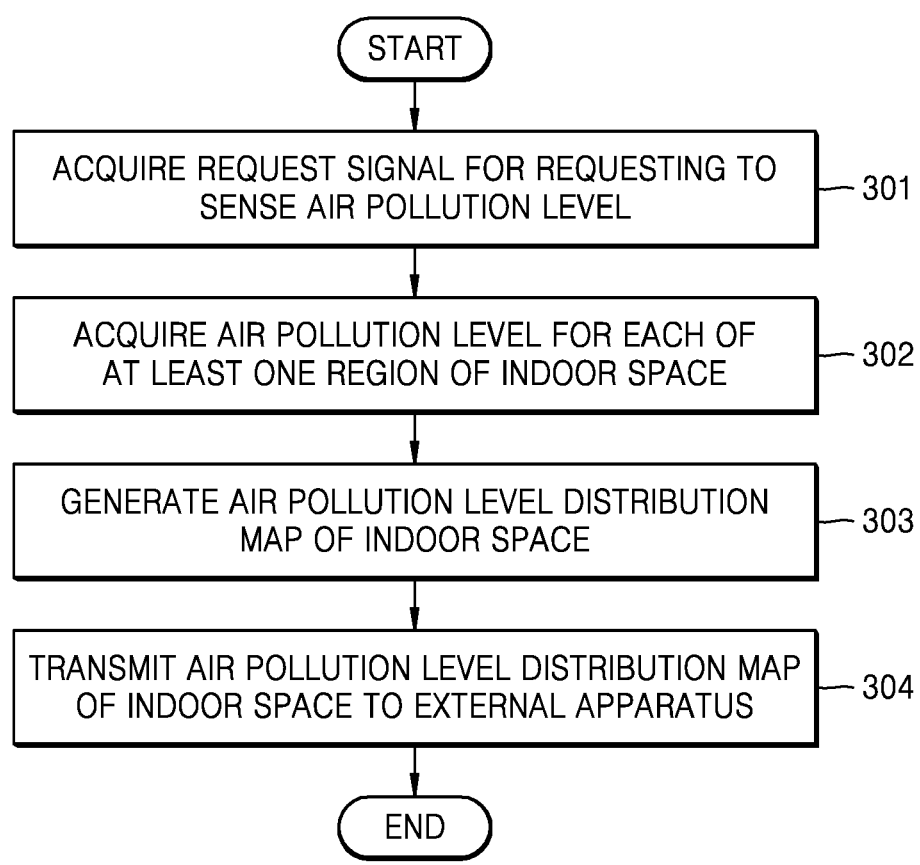

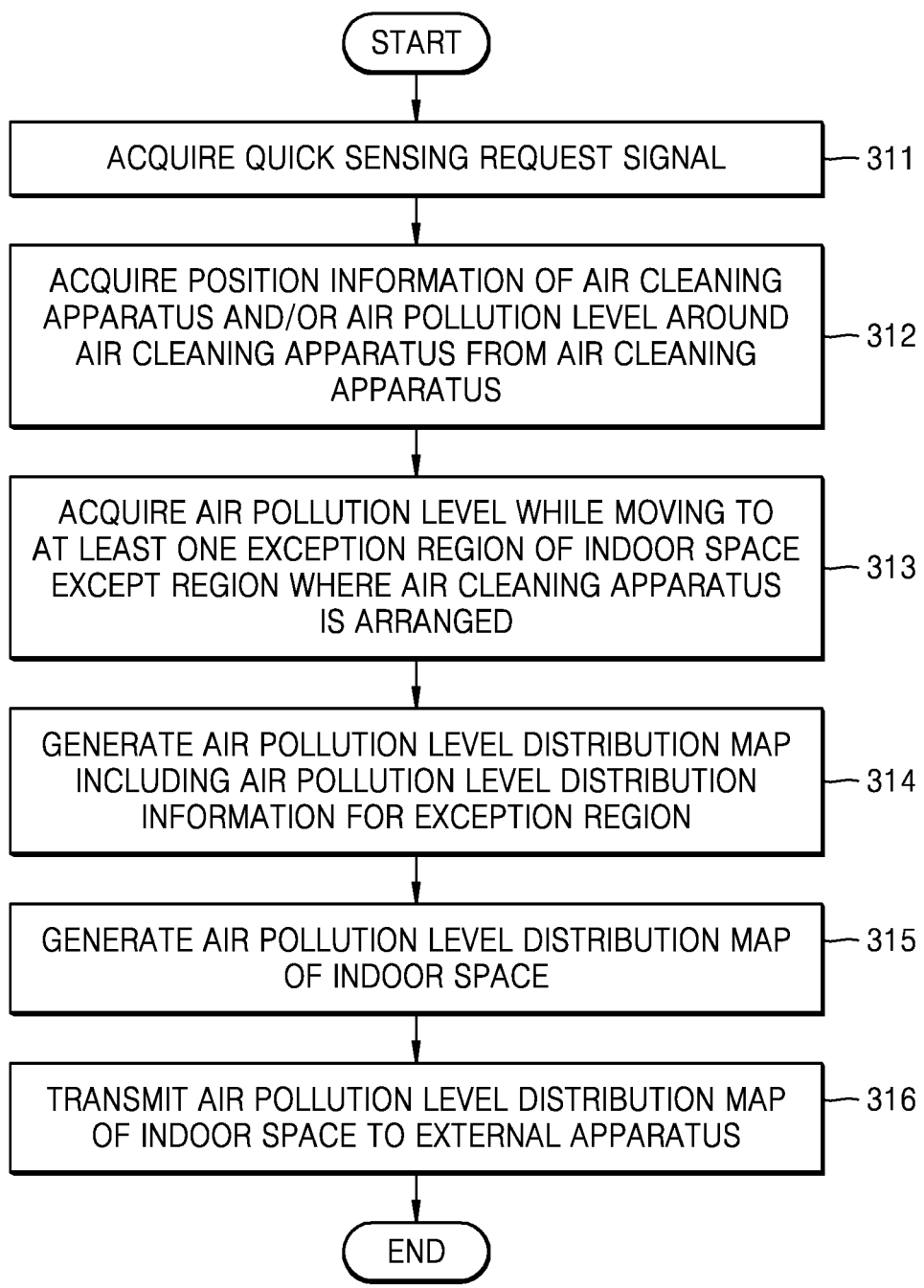

FIG. 5B

| AIR QUALITY INFORMATION | FIRST REGION | SECOND REGION | THIRD REGION | FOURTH REGION | FIFTH REGION | SIXTH REGION |
|---|---|---|---|---|---|---|
| DUST INHALATION AMOUNT (mg) | 200 | 3000 | 1600 | 190 | 230 | 380 |
| REGION-BY-REGION CLEANING PERIOD (min) | 10 | 300 | 40 | 1 | 10 | 20 |
| DUST INHALATION AMOUNT/TIME (mg/min) | 20 | 10 | 40 | 190 | 23 | 19 |
| AIR POLLUTION LEVEL | GOOD (3) | VERY GOOD (1) | GOOD (5) | VERY BAD (6) | GOOD (4) | GOOD (2) |

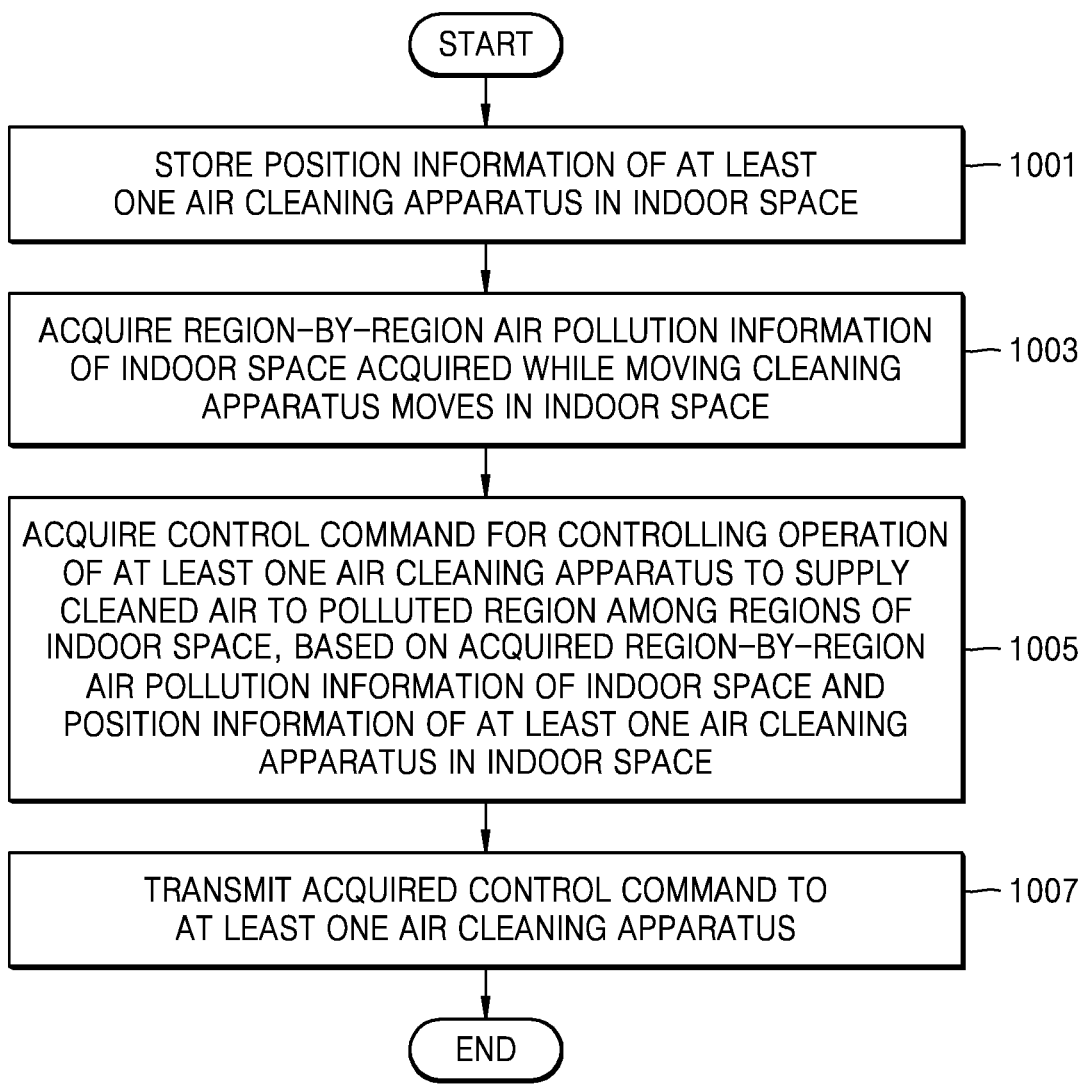

TERMINAL APPARATUS AND METHOD OF TRANSMITTING CONTROL COMMAND TO AIR CLEANING APPARATUS USING AIR POLLUTION INFORMATION ACQUIRED WHILE A MOVING CLEANING APPARATUS MOVES

CROSS-REFERENCE TO RELATED APPLICATION(S)

This application is based on and claims priority under 35 U.S.C. § 119 to U.S. Provisional Patent Application Ser. No. 62/685,549, filed on Jun. 15, 2018, in the United States Patent and Trademark Office, and to Korean Patent Application No. 10-2018-0147681, filed on Nov. 26, 2018, in the Korean Intellectual Property Office, the entire disclosure of each of which is incorporated herein by reference.

BACKGROUND

1. Field

The disclosure relates generally to a terminal apparatus and a method of transmitting a control command thereof, and more particularly, to a terminal apparatus that transmits a control command for controlling an air cleaning apparatus.

2. Description of the Related Art

Various electronic apparatuses may be provided indoors (in an indoor space) to remove indoor pollutants, such as a moving cleaning apparatus (e.g., a robot vacuum) for cleaning a floor, and an air cleaning apparatus for cleaning indoor air.

The moving cleaning apparatus may include a cleaning module for cleaning an indoor floor surface and a moving module (e.g., a motor) for moving the cleaning apparatus, which may be used to automatically clean while, moving on the ground surface. The moving cleaning apparatus may be controlled to avoid collisions with obstacles on a driving path and uniformly clean an area while moving on the floor.

The air cleaning apparatus may remove pollutants in indoor air. The air cleaning apparatus may remove bacteria, viruses, fungi, fine dust, odor-causing chemicals, etc., from drawn-in air. The air cleaning apparatus may include a filter for cleaning polluted indoor air. Pollutants in the air drawn into the air cleaning apparatus may be removed through the filter and thus the drawn-in air may be cleaned into clean air, and the clean air may be discharged outside the air cleaning apparatus.

A terminal apparatus may be used to control the cleaning moving apparatus or the air cleaning apparatus. The terminal apparatus may control an operation mode of the moving cleaning apparatus or the air cleaning apparatus while performing a wireless communication function with the moving cleaning apparatus or the air cleaning apparatus.

An air cleaning apparatus may be used for a method of removing indoor pollutants. In order to identify an indoor air pollution level, it may be necessary to operate the air cleaning apparatus. The air cleaning apparatus may display, for example, a current fine dust level or the good or bad of an air pollution level. A user may directly identify the air pollution level displayed by the air cleaning apparatus and operate the air cleaning apparatus when determining that the indoor air pollution level is bad. For example, the user may turn on or off the air cleaning apparatus or keep the air cleaning apparatus on at all times.

When the user directly identifies the air pollution level and operates the air cleaning apparatus, the air cleaning apparatus may be operated and arranged according to the user's subjective determination. In this case, it may be difficult for the air cleaning apparatus to operate in an optimal mode or to be arranged at an optimal position. Thus, the indoor cleaning efficiency over the operation time of the air cleaning apparatus may be reduced and unnecessary power consumption may be caused due to the long-time operation of the air cleaning apparatus.

SUMMARY

An aspect of the disclosure, provides a method of improving indoor cleaning efficiency of an air cleaning apparatus by using a terminal apparatus and a cleaning moving apparatus.

In accordance with an aspect of the disclosure, a method of transmitting a control command of a terminal apparatus is provided. The method includes storing position information of at least one air cleaning apparatus in an indoor space; acquiring region-by-region air pollution information of the indoor space acquired while a moving cleaning apparatus moves in the indoor space; acquiring, based on the acquired region-by-region air pollution information of the indoor space and the position information of the at least one air cleaning apparatus in the indoor space, a control command for controlling an operation of the at least one air cleaning apparatus to supply clean air to a polluted region among regions of the indoor space; and transmitting the acquired control command to the at least one air cleaning apparatus.

In accordance with another aspect of the disclosure, a terminal apparatus is provided. The terminal apparatus includes a communicator configured to communicate with an external apparatus; at least one processor electrically connected to the communicator; and a memory electrically connected to the at least one processor and configured to store position information of at least one air cleaning apparatus in an indoor space, wherein the memory is further configured to store at least one instruction set to, when executed by the at least one processor, acquire region-by-region air pollution information of the indoor space acquired while a moving cleaning apparatus moves in the indoor space; acquire, based on the acquired region-by-region air pollution information of the indoor space and the position information of the at least one air cleaning apparatus in the indoor space, a control command for controlling an operation of the at least one air cleaning apparatus to supply clean air to a polluted region among regions of the indoor space; and control the communicator to transmit the acquired control command to the at least one air cleaning apparatus.

In accordance with another aspect of the disclosure, a computer program product is provided. The computer program product includes a non-transitory computer-readable storage medium including at least one instruction set to acquire region-by-region air pollution information of an indoor space acquired while a moving cleaning apparatus moves in the indoor space; acquire, based on the acquired region-by-region air pollution information of the indoor space and position information of the at least one air cleaning apparatus in the indoor space, a control command for controlling an operation of at least one air cleaning apparatus to supply clean air to a polluted region among regions of the indoor space; and transmit the acquired control command to the at least one air cleaning apparatus.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1B is a diagram illustrating a system according to an embodiment;

FIG. 3A is a flowchart of a method in which a moving cleaning apparatus operates in a basic mode according to an embodiment;

FIG. 3B is a flowchart of a method in which a moving cleaning apparatus operates in a quick sensing mode according to an embodiment;

FIG. 5B is a table illustrating an air pollution level acquired by a moving cleaning apparatus according to an embodiment;

FIG. 10 is a flowchart of a method of providing information by a terminal apparatus according to an embodiment.

DETAILED DESCRIPTION

Figure 1A:
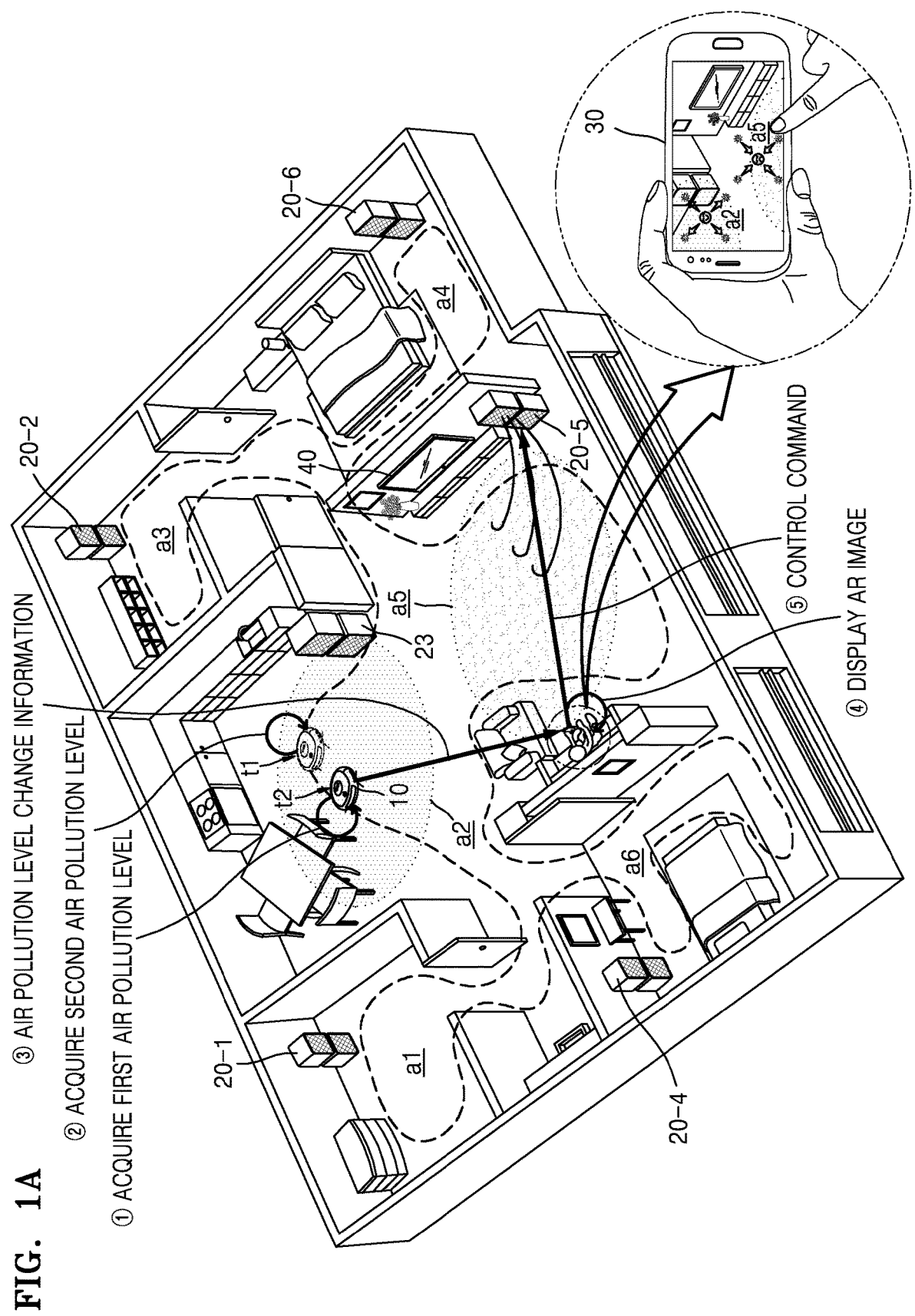
FIG. 1A is a diagram illustrating a system according to an embodiment.

Hereinafter, various embodiments of the disclosure are described with reference to the accompanying drawings. The embodiments and terms used herein are not intended to limit the disclosure to particular embodiments but may also include various modifications, equivalents, and/or alternatives thereof. Throughout the disclosure and the accompanying drawings, like reference numerals may be used to denote like elements or components.

As used herein, the singular forms "a," "an," and "the" may include the plural forms as well, unless the context clearly indicates otherwise. Expressions such as "A or B" and "at least one of A and/or B" may include any and all combinations of one or more of the associated listed items. Throughout the disclosure, the expression "at least one of A, B, or C" indicates only A, only B, only C, both A and B, both A and C, both B and C, all of A, B, and C, or variations thereof. Terms such as "first" and "second" used herein may modify various elements or components regardless of their order or importance. These terms may be used to distinguish one element or component from another element or component, but these elements or components are not intended to be limited by these terms.

When an element (e.g., a first element) is referred to as being "(operatively or communicatively) coupled to/with" or "connected to/with" another element (e.g., a second element), the element may be coupled to/with or connected to/with the other element directly or indirectly through one or more other elements (e.g., third elements).

As used herein, the expression "configured to (or set to)" may be interchangeable with, for example, the expressions "suitable for," "having the capacity to," "adapted to," "made to," "capable of," and "designed to" in software or hardware according to cases. In some case, the expression "apparatus configured to . . . " may indicate that the apparatus is "capable of . . . " along with other apparatuses or components. For example, the expression "a processor configured to (or set to) perform A, B, and C" may refer to a dedicated processor (e.g., an embedded processor) for performing a corresponding operation, or a general-purpose processor (e.g., a central processing unit (CPU) or an application processor (AP)) capable of performing a corresponding operation by executing one or more software programs stored in a memory device.

As used herein, the term "user" may refer to a person using an electronic apparatus, or an apparatus (e.g., an artificial intelligence (AI) electronic apparatus) using an electronic apparatus.

FIG. 1A is a diagram illustrating a system according to an embodiment.

Referring to FIG. 1A, in an indoor space, the system includes at least one of a moving cleaning apparatus 10, at least one air cleaning apparatus 20 (e.g., 20-1, 20-2, 20-4, and 20-6), a terminal apparatus 30, or a display apparatus 40.

At least two of the moving cleaning apparatus 10, the at least one air cleaning apparatus 20, the terminal apparatus 30, or the display apparatus 40 may communicate with each other through a network.

The network may be, for example, a private network and may be configured by an access point (ACP) such as a gateway, a router, or a sharer to which a certain address is assigned.

For example, at least two of the moving cleaning apparatus 10, the at least one air cleaning apparatus 20, the terminal apparatus 30, or the display apparatus 40 may perform direct communication with each other without an ACP. The direct communication may include, for example, at least one of Bluetooth, Bluetooth low energy, a standard of the Infrared Data Association (IrDA), wireless fidelity (Wi-Fi) direct, Zigbee, ultra wideband (UWB), near field communication (NFC), or long term evolution (LTE).

For example, at least two of the moving cleaning apparatus 10, the at least one air cleaning apparatus 20, the terminal apparatus 30, or the display apparatus 40 may communicate with each other through an external server. The external server may be communicatively connected.

The external server may be connected through a public network to which the network is connectable and may include a cloud server.

In addition, herein, two or more apparatuses may communicate with each other by being directly connected through short-range communication technology or by being communicatively connected through a third relay. The third relay may include, for example, a base station, a hub, an ACP, a gateway, a switch, or a relay server.

The terminal apparatus 30 may be implemented as a mobile device such as a mobile phone, a smart phone, or a smart pad such as a tablet computer. Alternatively, the terminal apparatus 30 may be implemented as a personal computer (PC) including a laptop or a desktop. The terminal apparatus 30 may be provided with at least one program that provides a service for managing and controlling the moving cleaning apparatus 10 or the at least one air cleaning apparatus 20. A relevant application may be distributed by a manufacturer of the moving cleaning apparatus 10 or the at least one air cleaning apparatus 20 and may be embedded and released in a manufacturing process of the terminal apparatus 30 or may be downloaded and installed in the terminal apparatus 30 from a market such as Galaxy App or PlayStore.

The moving cleaning apparatus 10 may perform a cleaning operation while moving in the indoor space. In addition, the moving cleaning apparatus 10 may generate an indoor map while moving in the indoor space, in order to efficiently plan a movement path for cleaning. For example, the moving cleaning apparatus 10 may photograph the indoor space by using a mounted camera and generate an indoor map based on the photographing information. Alternatively, the moving cleaning apparatus 10 may generate an indoor map based on sensor information acquired from a light detection and ranging (LiDAR) sensor or the like. For example, the indoor space may be divided into a first region a1, a second region a2, a third region a3, a fourth region a4, a fifth region a5, and a sixth region a6.

The moving cleaning apparatus 10 may measure an air pollution level of the indoor space while moving in the indoor space. For example, the moving cleaning apparatus 10 may measure an air pollution level of the indoor space based on an amount of dust drawn in by the moving cleaning apparatus 10 or a sensing value of a dust sensor provided in the moving cleaning apparatus 10.

The moving cleaning apparatus 10 may acquire a first air pollution level by measuring an air pollution level of the indoor space at a first time t1 (①) and acquire a second air pollution level by measuring an air pollution level of the indoor space at a second time t2 (②). For example, the moving cleaning apparatus 10 may acquire the first air pollution level measured in the second region a2 of the indoor space and acquire the second air pollution level measured in the second region a2 at the second time t2. In this case, the position of the moving cleaning apparatus 10 at the first time t1 and the position of the moving cleaning apparatus 10 at the second time t2 may be the same or similar positions, for example, within a radius of 1 m.

The moving cleaning apparatus 10 may acquire air pollution level change information indicating an increase or decrease in the air pollution level of the indoor space, based on the acquired first air pollution level and second air pollution level. The moving cleaning apparatus 10 may transmit the acquired air pollution level change information to the terminal apparatus 30 (③).

The terminal apparatus 30 may receive the air pollution level change information from the moving cleaning apparatus 10. In addition, according to a user action of projecting at least one region a2 or a5 of the indoor space through a lens of a camera of the terminal apparatus 30, the terminal apparatus 30 may acquire a real-time image of the at least one region a2 or a5 of the indoor space. The terminal apparatus 30 may generate an AR image synthesized such that a graphic indicates an increase or decrease in the air pollution level of the at least one region a2 or a5, based on the air pollution level change information and the real-time image (④). For example, the second region a2 may be displayed such that a graphic indicating a decrease in the air pollution level overlaps with the real-time image, and the fifth region a5 may be displayed such that a graphic indicating an increase in the air pollution level overlaps with the real-time image.

Through the AR image, the user may recognize that the air pollution state of the fifth region a5 is poor. Thus, the user may touch the fifth region a5 on a screen in order to clean the air of the fifth region a5. In response to the user input, the terminal apparatus 30 may transmit a control command to the air cleaning apparatus 20-5 located close to the fifth region a5 such that at least one air cleaning apparatus 20 may provide clean air to the fifth region a5 (⑤).

Upon receiving the control command, the air cleaning apparatus 20-5 may provide clean air toward the fifth region a5 according to the control command. For example, the air cleaning apparatus 20-5 may provide clean air toward the fifth region a5 by controlling at least one of air current direction, air current amount, or air current speed thereof.

FIG. 1B is a diagram illustrating a system according to an embodiment.

Referring to FIG. 1B, in the indoor space, the system may include at least one of the moving cleaning apparatus 10, at least one air cleaning apparatus 20 (e.g., 20-1 to 20-6), the terminal apparatus 30, or the display apparatus 40. The moving cleaning apparatus 10, the at least one air cleaning apparatus 20 (e.g., 20-1 to 20-6), the terminal apparatus 30, and the display apparatus 40 may correspond respectively to the moving cleaning apparatus 10, the at least one air cleaning apparatus 20 (20-1 to 20-6), the terminal apparatus 30, and the display apparatus 40 of FIG. 1A, and thus redundant descriptions thereof are omitted here.

The moving cleaning apparatus 10 may acquire a first air pollution level by measuring an air pollution level of the indoor space at a first time t1 (①) and acquire a second air pollution level by measuring an air pollution level of the indoor space at a second time t2 (②). For example, the moving cleaning apparatus 10 may acquire the first air pollution level measured in a first region a1 of the indoor space at the first time t1 and acquire the second air pollution level measured in the first region a1 at the second time t2.

The moving cleaning apparatus 10 may acquire air pollution level change information indicating an increase or decrease in the air pollution level of the indoor space, based on the acquired first air pollution level and second air pollution level. The moving cleaning apparatus 10 may transmit the acquired air pollution level change information to the air cleaning apparatus 20-5 (③).

Based on the received air pollution level change information, the air cleaning apparatus 20-5 may determine that the air of the fifth region a5 is gradually polluted. Accordingly, the air cleaning apparatus 20-5 may provide clean air toward the fifth region a5 of the indoor space. For example, based on the determined air pollution state, the air cleaning apparatus 20-5 may provide clean air toward the fifth region a5 by controlling at least one of the air current direction, the air current amount, or the air current speed thereof.

Figure 2:
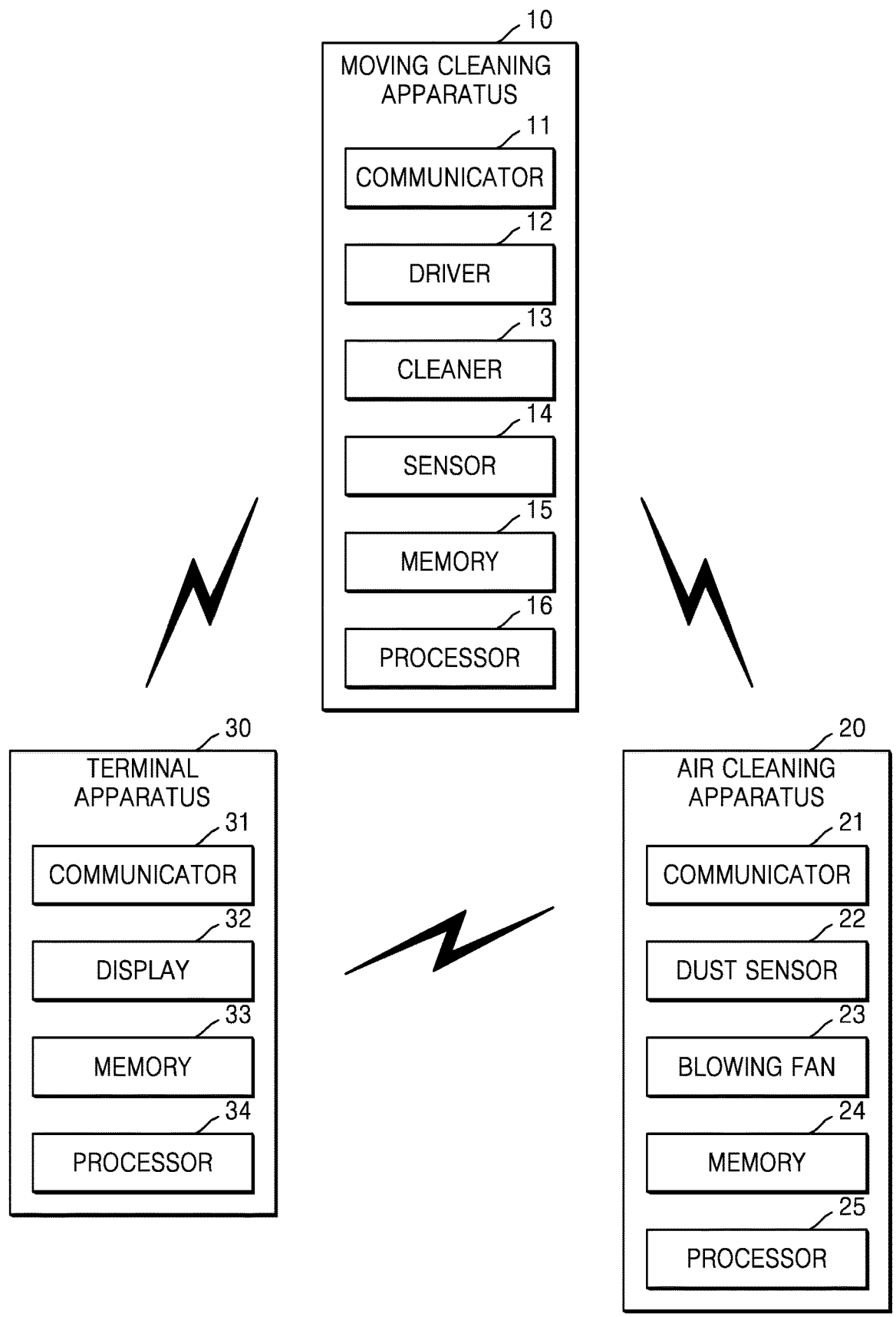
FIG. 2 is a block diagram of a moving cleaning apparatus, an air cleaning apparatus, and a terminal apparatus included in a system according to an embodiment.

FIG. 2 is a block diagram illustrating a configuration of a moving cleaning apparatus 10, an air cleaning apparatus 20, and a terminal apparatus 30 included in a system according to an embodiment.

Referring to FIG. 2, the moving cleaning apparatus 10 may include a communicator 11, a driver 12, a cleaner 13, a sensor 14, a memory 15, and a processor 16.

The moving cleaning apparatus 10 may automatically drive and clean the floor surface of a certain area range (e.g., each region of the indoor space).

In an embodiment of the disclosure, the moving cleaning apparatus 10 may include the sensor 14 capable of detecting the surrounding environment thereof and thus may be implemented as an autonomous driving apparatus capable of recognizing its own position and moving to a destination.

The communicator 11 may include hardware such as a communication circuit or a communication integrated circuit or chip for performing wireless communication based on various wireless protocols. Examples of various types of the wireless communication protocol supported by the communicator 11 may include Wi-Fi, Bluetooth, infrared, radio frequency (RF), Zigbee, Wi-Fi direct, and LTE. For example, according to the support protocol of the communicator 11, the moving cleaning apparatus 10 may access an ACP to communicate with another apparatus through a certain network or to communicate directly with another apparatus. In addition, the moving cleaning apparatus 10 may communicate through the communicator 11 with other apparatuses, for example, at least one of the air cleaning apparatus 20, the terminal apparatus 30, a server (e.g., a home server), or a charging station.

The driving force for all the operations of the moving cleaning apparatus 10 including the driver 12 and the cleaner 13 may be provided by a battery embedded in the moving cleaning apparatus 10, and the moving cleaning apparatus 10 may be provided with a charging terminal for charging the battery.

For movement of the moving cleaning apparatus 10, the driver 12 may basically include one or more wheels that contact the floor surface, a motor as a driver that generates a driving force for the movement, and a link and axis structure that transmits the driving force of the motor to the wheels. The driver 12 may have a plurality of wheels and individually drive each of the wheels, thereby making it possible for the moving cleaning apparatus 10 to perform various driving such as forward movement, backward movement, rotation movement, and return movement. The movement direction and the movement speed of the moving cleaning apparatus 10 by the driver 12 may be determined by a control signal transmitted to the motor from the processor 16 in the moving cleaning apparatus 10. Alternatively, the driver 12 may further include a steering mechanism for physically changing the angle of each of the plurality of wheels according to a control signal of the processor 16.

The cleaner 13 may include a brush for scattering foreign substances such as dust on the floor surface, an inhalation module for inhaling the scattered foreign substances, and/or a storage tank for storing the drawn-in foreign substances. The cleaner 13 may clean the floor surface by operating when the moving cleaning apparatus 10 is moved by the driver 12 or when the moving cleaning apparatus 10 is stopped.

The sensor 14 may include at least one sensor capable of detecting the surrounding environment thereof. The sensor 14 may be provided to detect the surrounding environment of the moving cleaning apparatus 10 that is moving or cleaning. In an embodiment of the disclosure, the sensor 14 may operate as a position recognition module capable of recognizing the position of the moving cleaning apparatus 10 based on the sensing result of the sensors.

The sensors of the sensor 14 may include an image sensor provided in the camera and a position recognition sensor such as a LiDAR sensor, a three-dimensional (3D) sensor, a geomagnetic sensor, an infrared ray (IR) sensor, an ultrasonic sensor, a laser sensor, a radar sensor, or a position sensitive detector (PSD) sensor.

In an embodiment of the disclosure, the position recognition sensor may measure a distance and sense an object by using radio waves. The sensor 14 may transmit a sensing signal frontward through the position recognition sensor, receive a reflection signal thereof, and detect the surrounding environment including an obstacle by using the received reflection signal. The sensing signal used in the position recognition sensor is not limited in frequency band and may have a spectrum in which energy is distributed in a wide frequency band. For example, the sensing signal may be implemented as a UWB RF signal to minimize interference with other signals of a relatively narrow band (e.g., global positioning system (GPS), Bluetooth, Zigbee, and a wireless local area network (WLAN)). The image sensor may generate an image by imaging or capturing an image of the surrounding environment of the moving cleaning apparatus 10.

The moving cleaning apparatus 10 may include a camera including an image sensor. The camera may include an image sensor and a lens through which a captured image is transmitted. The image sensor may include a complementary metal-oxide semiconductor (CMOS) sensor or a charge-coupled device (CCD) sensor and may capture a frontward image of the moving cleaning apparatus 10 and generate the capturing result as a digital image. The camera may be provided with various types of optical lenses to capture an image of the surrounding environment in a wider range or capture a more accurate image thereof. The camera may include a lens having a wide viewing angle to photograph all surrounding regions even at a certain position. In addition, the camera may be installed upward to photograph all regions of the ceiling. Based on the captured image data of the ceiling, the moving cleaning apparatus 10 may recognize its own position or generate a map of the cleaning region, that is, a navigation map. Furthermore, a pre-generated map may be modified by using the image data, and an integrated navigation map for the entire cleaning region may be generated by using the image data captured by other moving cleaning apparatuses 10.

The camera may be installed on a front or a top side of the moving cleaning apparatus 10 to capture a frontward image of the moving cleaning apparatus 10, which is the movement direction of the moving cleaning apparatus 10. The moving cleaning apparatus 10 may be provided with a plurality of cameras. The position recognition sensor of the sensor 14 may be installed on the front or top side of the moving cleaning apparatus 10 to detect an obstacle located in the movement direction of the moving cleaning apparatus 10.

In an embodiment of the disclosure, the moving cleaning apparatus 10 may use the data acquired through the sensor 14 to generate or modify the map.

The sensor 14 may include a dust sensor. The dust sensor may be for measuring the air quality of the indoor space and may measure the dust concentration (e.g., the air pollution level) in the air and transmit the dust measurement value to the processor 16. In addition, the sensor 14 may include various types of sensors for measuring the air conditions, such as a gas sensor (a volatile organic compound (VOC)

sensor) for measuring the gas concentration in the air, a carbon dioxide ($CO_2$) sensor for measuring the $CO_2$ concentration in the air, a radon sensor for measuring the radon concentration in the air, a humidity sensor for measuring the humidity in the air, and a temperature sensor for measuring the temperature of the air.

The memory 15 may be provided as a place for storing or loading data. The memory 15 may include a nonvolatile memory in which data is stored regardless of whether system power is applied and a volatile memory in which data processed by the processor 16, for example, a control program, is temporarily loaded. For example, the nonvolatile memory may include a flash memory, an erasable programmable read only memory (EPROM), a hard disk drive (HDD), a secure data device (SDD), or a read only memory (ROM), and the volatile memory may include a random access memory (RAM) or a buffer.

The memory 15 may store a navigation map for the cleaning region. In this case, the navigation map may include at least one of an obstacle map for showing the cleaning region or a feature map that is internally stored. The feature map may be used by the moving cleaning apparatus 10 to determine its current position. The memory 15 may store data such as control programs, applications, or algorithms for the operation of the moving cleaning apparatus 10 related to cleaning, charging, driving, or the like.

The processor 16 may be a combination of a CPU, a chipset, and a microcontroller, or a circuit implemented as a system on chip (SoC). The processor 16 may perform instruction operations and operations for all operations performed by the moving cleaning apparatus 10 according to a control program. The control program may include one or more programs implemented in the form of at least one of a basic input/output system (BIOS), a device driver, an operating system (OS), firmware, a platform, or an application program (an application). In an embodiment of the disclosure, the application program may be installed or stored in advance in the manufacturing process of the moving cleaning apparatus 10 or may be installed in the moving cleaning apparatus 10 for future use based on the data of the application program received from outside. For example, the data of the application program may be downloaded to the moving cleaning apparatus 10 from an external server such as an application market. The application program may be an example of a computer program product of the disclosure but is not limited thereto.

The memory 15 may store at least one instruction set to acquire a first air pollution level of the indoor space measured at a first time and a second air pollution level of the indoor space measured at a second time, as the moving cleaning apparatus 10 moves in the indoor space; acquire air pollution level change information indicating an increase or decrease in that the air pollution level of the indoor space, based on the first air pollution level and the second air pollution level; and transmit to the air pollution level change information to an external apparatus communicatively connected to the moving cleaning apparatus 10.

The memory 15 may store at least one instruction set to acquire the first air pollution level and the second air pollution level based on the amount of dust drawn in by the moving cleaning apparatus 10 or the sensing value of the dust sensor provided in the moving cleaning apparatus 10.

The memory 15 may store at least one instruction set to acquire the first air pollution level and the second air pollution level based on the dust inhalation amount per unit time of the moving cleaning apparatus 10.

The memory 15 may store at least one instruction set to control dust sensor provided in the charging station of the moving cleaning apparatus 10, when the measurement sensitivity of the first air pollution level or the second air pollution level is less than or equal to a threshold value; and acquire the first air pollution level and the second air pollution level based on the sensing value of the dust sensor.

The memory 15 may store at least one command set to determine a region-by-region cleaning mode of the indoor space by using the air pollution level change information; and perform a cleaning operation according to the determined cleaning mode.

The memory 15 may store at least one instruction set to acquire the first air pollution level and the second air pollution level in at least one exception region of the indoor space except a region where the air cleaning apparatus is arranged.

The memory 15 may store at least one instruction set to acquire the air pollution level change information including air pollution level distribution information representing a region-by-region air pollution level of the indoor space.

The memory 15 may store at least one instruction set to generate a navigation map of the indoor space as the moving cleaning apparatus 10 moves in the indoor space; and to acquire region-by-region air pollution level distribution information included in the generated navigation map.

The memory 15 may store at least one instruction set to acquire the first air pollution level measured in one region of the indoor space at the first time and the air pollution level measured in the same region as the one region at the second time.

The air cleaning apparatus 20 may include a communicator 21, a dust sensor 22, a blowing fan 23, a memory 24, and a processor 25.

The communicator 21 may include hardware such as a communication circuit or a communication chip for performing wireless communication based on various wireless protocols. Examples of various types of the wireless communication protocol supported by the communicator 21 may include Wi-Fi, Bluetooth, infrared, RF, Zigbee, Wi-Fi direct, and LTE. For example, according to the support protocol of the communicator 21, the air cleaning apparatus 20 may access an ACP to communicate with another apparatus through a certain network or to communicate directly with another apparatus. In addition, the air cleaning apparatus 20 may communicate through the communicator 21 with other apparatuses, for example, at least one of the moving cleaning apparatus 10, the terminal apparatus 30, a server (e.g., a home server), or a gateway.

The dust sensor 22 may be for measuring the air quality of the indoor space where the air cleaning apparatus 20 is installed and may measure the dust concentration (e.g., the air pollution level) in the air drawn into the air cleaning apparatus 20 and transmit the dust measurement value to the processor 25. Furthermore, the air cleaning apparatus 20 may further include various types of sensors for measuring the air conditions, such as a gas sensor (e.g., a VOC sensor) for measuring the gas concentration in the air, a $CO_2$ sensor for measuring the $CO_2$ concentration in the air, a radon sensor for measuring the radon concentration in the air, a humidity sensor for measuring the humidity in the air, and a temperature sensor for measuring the temperature of the air.

The blowing fan 23 may form an air flow according to a drive control signal of the processor 25, inhale outside air, that is, indoor air, into the air cleaning apparatus 20 through an inlet, filter the air drawn in through a filter unit, and then discharge the filtered air outside the air cleaning apparatus 20 through an outlet. The blowing fan 23 may be rotated by a motor to form an air flow. The rotation speed of the motor may be adjusted by receiving a control signal from the processor 25 according to the dust measurement value measured by the dust sensor 22. Alternatively, the rotation speed may be adjusted by receiving a control signal from the processor 25 according to the control command received from the blowing fan 23 or the terminal apparatus 30.

The memory 24 may be provided as a place for storing or loading data. The memory 24 may include a nonvolatile memory in which data is stored regardless of whether system power is applied and a volatile memory in which data processed by the processor 25, for example, a control program, is temporarily loaded. For example, the nonvolatile memory may include a flash memory, an EPROM, an HDD, an SDD, or a ROM, and the volatile memory may include a RAM or a buffer.

The processor 25 may be a combination of a CPU, a chipset, and a microcontroller, or a circuit implemented as an SoC. The processor 25 may perform instruction operations and operations for all operations performed by the air cleaning apparatus 20 according to a control program. The control program may include one or more programs implemented in the form of at least one of a BIOS, a device driver, an OS, firmware, a platform, or an application program (an application). The application program may be installed or stored in advance in the manufacturing process of the air cleaning apparatus 20 or may be installed in the air cleaning apparatus 20 for future use based on the data of the application program received from outside. For example, the data of the application program may be downloaded to the air cleaning apparatus 20 from an external server such as an application market. The application program may be an example of a computer program product of the disclosure but is not limited thereto.

The memory 24 may store at least one instruction set to acquire, from the terminal apparatus 30, a control command for controlling an operation of the air cleaning apparatus 20 to supply clean air to a polluted region among the regions of the indoor space; and control the operation (e.g., air current direction, air current amount, air current speed, or operation time) of the air cleaning apparatus 20 according to the control command.

The terminal apparatus 30 includes a communicator 31, a display 32, a memory 33, and a processor 34.

The terminal apparatus 30 may include at least one of a smart phone, a tablet PC, a mobile phone, a video phone, an electronic book reader, a desktop PC, a laptop PC, a netbook computer, a workstation, a personal digital assistant (PDA), a portable multimedia player (PMP), a moving picture experts group audio layer 3 (MP3) player, a medical apparatus, a camera, or a wearable apparatus. The wearable apparatus may include at least one of accessory-type devices (e.g., watches, rings, wristlets, anklets, necklaces, spectacles, contact lenses, or head-mounted devices (HMDs)), textile or clothing-integrated devices (e.g., electronic clothing), body-attachable devices (e.g., skin pads or tattoos), or bio-implantable devices. In addition, the terminal apparatus 30 may include, for example, at least one of a television (TV), a digital video disk (DVD) player, an audio device, a refrigerator, an air conditioner, a cleaner, an oven, a microwave oven, a washing machine, an air cleaner, a set-top box, a home automation control panel, a security control panel, a media box (e.g., Samsung HomeSync™, Apple TV®, or Goggle TV™), a game console (e.g., Xbox® or PlayStation®), an electronic dictionary, an electronic key, a camcorder, or an electronic picture frame.

The communicator 31 may include hardware such as a communication circuit or a communication chip for performing wireless communication based on various wireless protocols. Examples of various types of the wireless communication protocol supported by the communicator 31 may include Wi-Fi, Bluetooth, infrared, RF, Zigbee, Wi-Fi direct, and LTE. For example, according to the support protocol of the communicator 31, the terminal apparatus 30 may access an ACP to communicate with another apparatus through a certain network or to communicate directly with another apparatus. In addition, the terminal apparatus 30 may communicate through the communicator 31 with other apparatuses, for example, at least one of the moving cleaning apparatus 10, the air cleaning apparatus 20, a server (e.g., a home server), a charging station, or a gateway. Furthermore, the communicator 31 may include a mobile communicator, and the mobile communicator may be connected to another apparatus by using one or more antennas under the control of the processor 34. The mobile communicator may communicate wireless signals for voice calls, video calls, text messages (short message service (SMS)), multimedia images (multimedia messaging service (MMS)), and data communication with mobile phones, smart phones, tablets, or other terminal apparatuses (portable apparatuses) having telephone numbers connectable to the terminal apparatus 30.

The display 32 may display visual information processed by the processor 34. The display 32 may be implemented in any suitable display mode including, for example, liquid crystal, plasma, light-emitting diode, organic light-emitting diode, surface-conduction electron-emitter, carbon nanotube, or nano-crystal. The display 32 may further include an additional component such as a driver according to the implementation mode thereof. The display 32 may display an object (e.g., a menu, a text, an image, a video, a graphic, an icon, or a shortcut icon) including a menu item of the terminal apparatus 30 as a user interface (UI). The object may be displayed on an initial screen of the terminal apparatus 30 and may include an icon corresponding to an application for controlling the moving cleaning apparatus 10 or the air cleaning apparatus 20. In addition, the display 32 may display guide information for guiding the arrangement or operation of at least one air cleaning apparatus 20, based on the region-by-region air pollution information of the indoor space and the position information of at least one air cleaning apparatus 20 in the indoor space. The guide information may include at least one of the region-by-region air pollution information of the indoor space, a graphic indicating the position of at least one air cleaning apparatus 20 in the indoor space, or at least one UI for controlling at least one air cleaning apparatus 20.

The memory 33 may be provided as a place for storing or loading data. The memory 33 may include a nonvolatile memory in which data is stored regardless of whether system power is applied and a volatile memory in which data processed by the processor 34, for example, a control program, is temporarily loaded. For example, the nonvolatile memory may include a flash memory, an EPROM, an HDD, an SDD, or a ROM, and the volatile memory may include a RAM or a buffer.

The processor 34 may be a combination of a CPU, a chipset, an AP, and a microcontroller, or a circuit implemented as an SoC. The processor 34 may perform instruction operations and operations for all operations performed by the terminal apparatus 30 according to a control program. The control program may include one or more programs implemented in the form of at least one of a BIOS, a device driver, an OS, firmware, a platform, or an application program (an application). The application program may be installed or stored in advance in the manufacturing process of the terminal apparatus 30 or may be installed in the air cleaning apparatus 20 for future use based on the data of the application program received from outside. For example, the data of the application program may be downloaded to the terminal apparatus 30 from an external server such as an application market. The application program may be an example of a computer program product of the disclosure but is not limited thereto.

The processor 34 may include a single core, a dual core, a triple core, a quad core, or any multiple core thereof. The processor 34 may include a plurality of processors, for example, a main processor and a sub processor operating in a sleep mode (e.g., a mode in which only standby power is supplied and it does not operate as a display apparatus). In addition, the processor, the ROM, and the RAM may be interconnected through an internal bus. When the terminal apparatus 30 is implemented as a desktop or laptop computer, the processor 34 may further include a graphics processing unit (GPU) for graphic processing. When the terminal apparatus 30 is implemented as a mobile device such as a smart pad or a smart phone, or a smart TV, the processor 34 may include a GPU and may be implemented, for example, in the form of a SoC including a combination of a core and a GPU.

The memory 33 may store at least one instruction set to acquire the region-by-region air pollution information of the indoor space acquired while the moving cleaning apparatus 10 moves in the indoor space; acquire a control command for controlling an operation of at least one air cleaning apparatus 20 to supply clean air to a polluted region among the regions of the indoor space, based on the acquired region-by-region air pollution information of the indoor space and the position information of at least one air cleaning apparatus 20 in the indoor space; and control the communicator 31 to transmit the acquired control command to at least one air cleaning apparatus 20.

The memory 33 may store at least one instruction set to control the display 32 to display the guide information for guiding the arrangement or operation of at least one air cleaning apparatus 20, based on the region-by-region air pollution information of the indoor space and the position information of at least one air cleaning apparatus 20 in the indoor space.

The memory 33 may store at least one instruction set to acquire a user request signal for controlling an operation of at least one air cleaning apparatus based on the displayed guide information; and acquire a control command for controlling an operation of at least one air cleaning apparatus to supply clean air to a polluted region among the regions of the indoor space, based on the user request signal.

The memory 33 may store at least one instruction set to acquire a real-time image of at least one region of the indoor space; and control the display 32 to display an AR image synthesized such that the air pollution information of the at least one region overlaps with the real-time image, based on the air pollution information and the real-time image.

The region-by-region air pollution information of the indoor space may include at least one of a region-by-region air pollution level of the indoor space or region-by-region air pollution level change information of the indoor space indicating an increase or decrease in the air pollution level of the indoor space. In addition, the region-by-region air pollution information of the indoor space may include a region-by-region air pollution level of the indoor space acquired based on at least one of the amount of dust drawn in by the moving cleaning apparatus 10 or the sensing value of the dust sensor provided in the moving cleaning apparatus 10. Furthermore, the region-by-region air pollution information of the indoor space may include a region-by-region air pollution level of the indoor space acquired based on at least one of the dust inhalation amount per unit time of the moving cleaning apparatus 10 or the sensing value per unit time of the dust sensor provided in the moving cleaning apparatus 10.

FIGS. 3A, 3B, 3C, and 3D are flowcharts of methods of a moving cleaning apparatus according to embodiments.

Figure 3C:
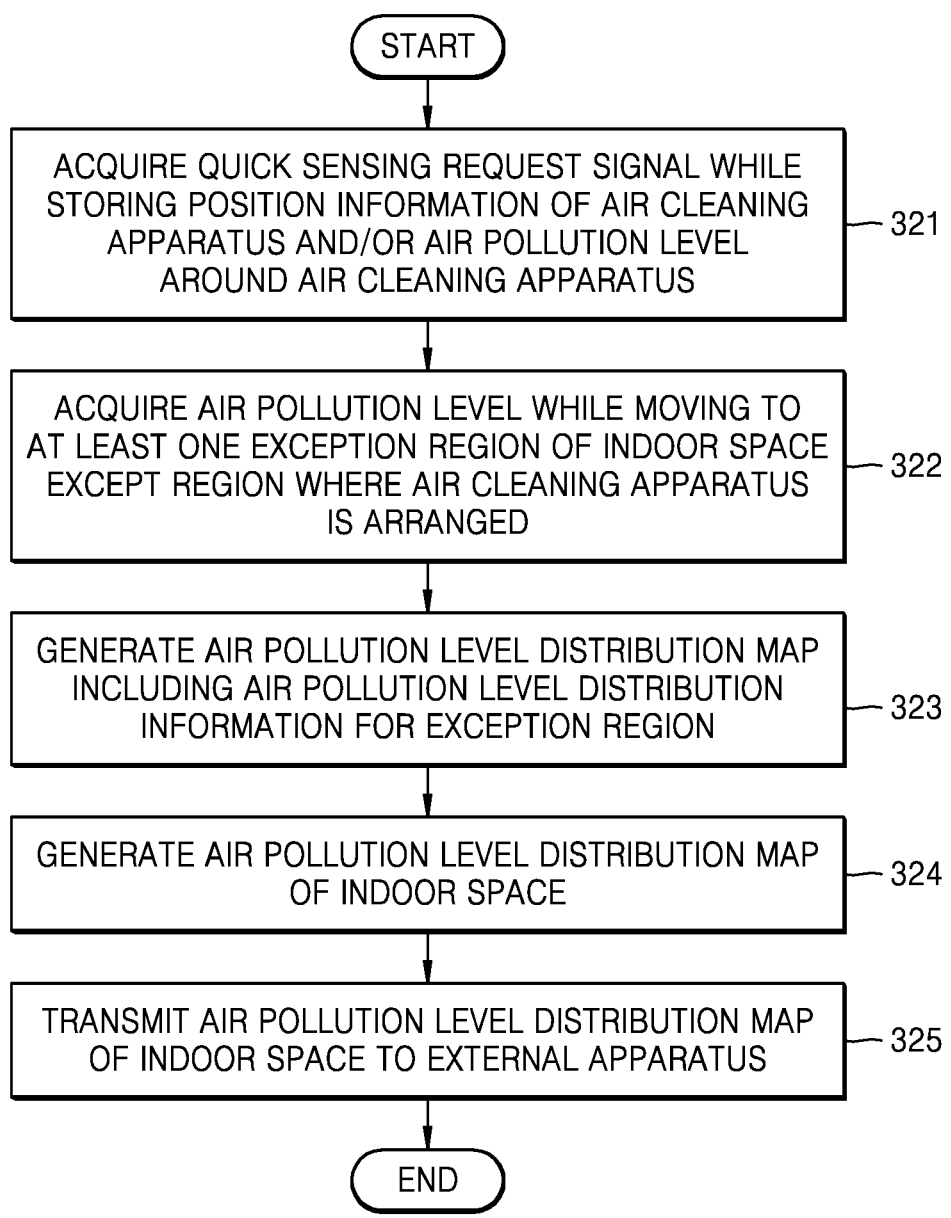
FIG. 3C is a flowchart of a method in which a moving cleaning apparatus operates in a quick sensing mode according to an embodiment.
Figure 3D:
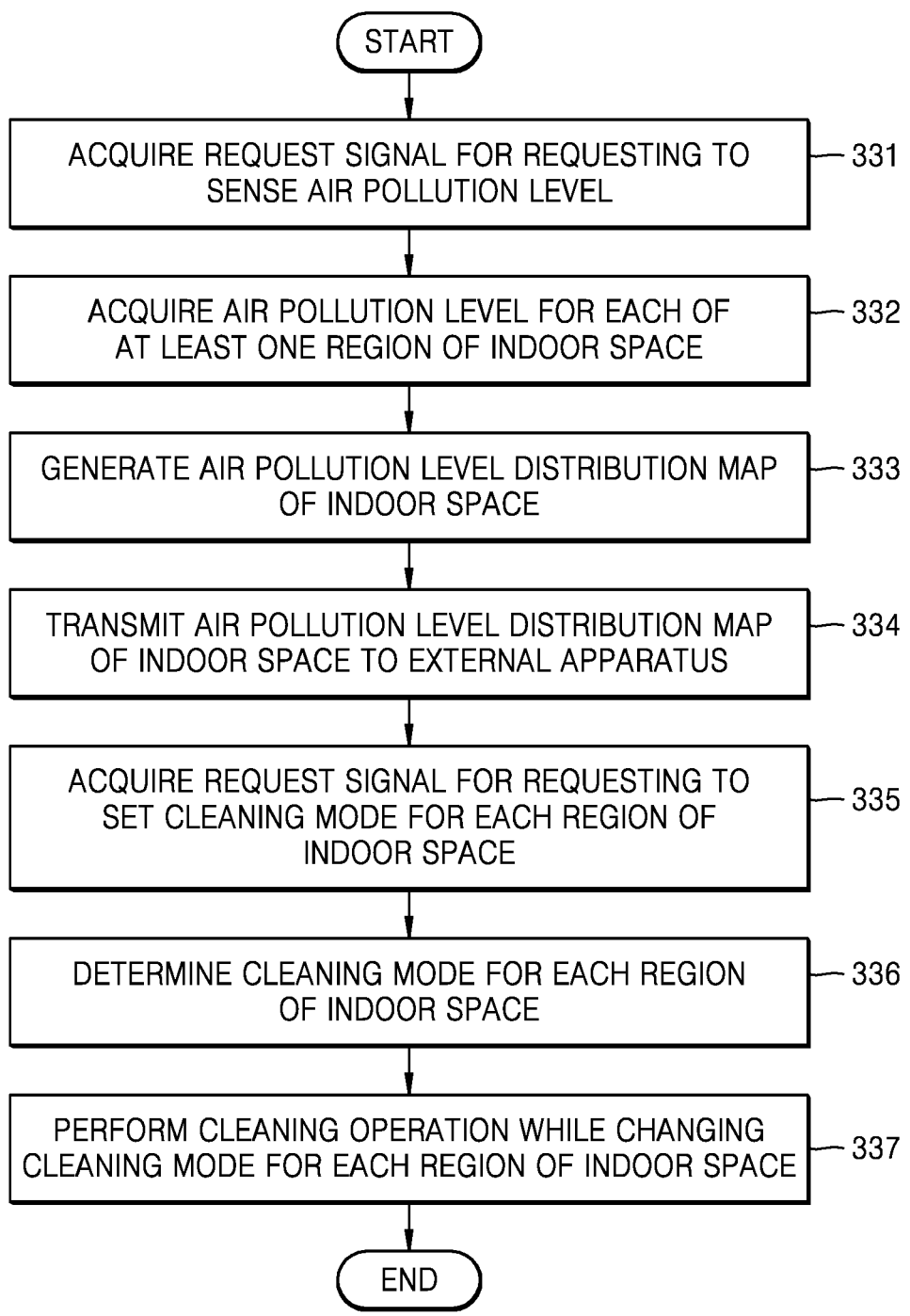
FIG. 3D is a flowchart of a method in which a moving cleaning apparatus operates in a cleaning mode according to an embodiment.

FIG. 3A is a flowchart of a method in which the moving cleaning apparatus 10 operates in a basic mode of acquiring an air pollution level of each region of the indoor space. In addition, FIGS. 3B and 3C are flowcharts in which the moving cleaning apparatus 10 operates in a quick sensing mode of acquiring the air pollution level of at least one region except a region where the air cleaning apparatus 20 is arranged. FIG. 3D is a flowchart in which the moving cleaning apparatus 10 operates in a cleaning mode.

Referring to FIG. 3A, the moving cleaning apparatus 10 may acquire a request signal for requesting to sense an air pollution level in operation 301. For example, as a user input for requesting to sense the air pollution level is performed through a UI provided in the moving cleaning apparatus 10, the moving cleaning apparatus 10 may acquire a user input signal corresponding to the user input as the request signal. Alternatively, as a user input for requesting to sense the air pollution level is performed through a control application of the moving cleaning apparatus 10 provided in the terminal apparatus 30, the moving cleaning apparatus 10 may acquire a user input signal corresponding to the user input as the request signal from the terminal apparatus 30.

Upon acquiring the request signal, the moving cleaning apparatus 10 may acquire an air pollution level for each of at least one region of the indoor space while moving in the indoor space in operation 302. For example, the moving cleaning apparatus 10 may inhale foreign substances (e.g., dust) on the floor surface and determine the air pollution level based on the dust inhalation amount. Alternatively, the moving cleaning apparatus 10 may determine the air pollution level based on the sensing value of the dust sensor provided in the moving cleaning apparatus 10.

Upon acquiring the air pollution level, the moving cleaning apparatus 10 may generate an air pollution level distribution map including the region-by-region air pollution level of the indoor space in operation 303. For example, when the moving cleaning apparatus 10 moves in the indoor space to generate a navigation map of the indoor space, the air pollution level distribution information may include air pollution level distribution information for each region of the generated navigation map. That is, the moving cleaning apparatus 10 may map the air pollution level for each region of the generated navigation map to generate the air pollution level distribution map.

When the air pollution level distribution map of the indoor space is generated, the moving cleaning apparatus 10 may transmit the generated air pollution level distribution map of the indoor space to an external apparatus (e.g., the terminal apparatus 30 or the air cleaning apparatus 20) connected to the moving cleaning apparatus 10 in operation 304.

The moving cleaning apparatus 10 may acquire air pollution level change information indicating an increase or decrease in the air pollution level for each of at least one region, based on the air pollution level measured in at least one region at a certain period or at each event occurrence. Upon acquiring the air pollution level change information of the indoor space, the moving cleaning apparatus 10 may transmit the air pollution level distribution map including the acquired air pollution level change information of the indoor space to an external apparatus (e.g., the terminal apparatus 30 or the air cleaning apparatus 20) connected to the moving cleaning apparatus 10.

FIG. 3B is a flowchart of a method in which the moving cleaning apparatus 10 operates in a first quick sensing mode according to an embodiment.

Referring to FIG. 3B, the moving cleaning apparatus 10 may acquire a quick sensing request signal for quickly detecting the air pollution level of the indoor space in operation 311. For example, as a user input for requesting to quickly sense the air pollution level is performed through a UI provided in the moving cleaning apparatus 10, the moving cleaning apparatus 10 may acquire a user input signal corresponding to the user input as the request signal. Alternatively, as a user input for requesting to sense the air pollution level is performed through a control application of the moving cleaning apparatus 10 provided in the terminal apparatus 30, the moving cleaning apparatus 10 may acquire a user input signal corresponding to the user input as the request signal from the terminal apparatus 30.

Upon acquiring the request signal, the moving cleaning apparatus 10 may acquire the position information of the air cleaning apparatus 20 and/or the air pollution level around the air cleaning apparatus 20 from the air cleaning apparatus 20 in operation 312.

Next, the moving cleaning apparatus 10 may acquire an air pollution level while moving to at least one exception region of the indoor space except a region where the air cleaning apparatus 20 is arranged in operation 313.

Upon acquiring the air pollution level, the moving cleaning apparatus 10 may generate an air pollution level distribution map including air pollution level distribution information for the exception region in operation 314. In this case, the air pollution level distribution map may include the air pollution level of each of at least one exception region.

In addition, the moving cleaning apparatus 10 may acquire at least one of the air pollution level or the air pollution level change information around the air cleaning apparatus 20 from the air cleaning apparatus 20. The moving cleaning apparatus 10 may generate an air pollution level distribution map of the indoor space by using the air pollution level distribution map for the exception region and the air pollution level acquired from the air cleaning apparatus 20 in operation 315.

When the air pollution level distribution map of the indoor space is generated, the moving cleaning apparatus 10 may transmit the generated air pollution level distribution map to an external apparatus (e.g., the terminal apparatus 30 or the air cleaning apparatus 20) connected to the moving cleaning apparatus 10 in operation 316.

Upon acquiring the request signal, the moving cleaning apparatus 10 may acquire the position information of the air cleaning apparatus 20 and/or the air pollution level change information around the air cleaning apparatus 20 from the air cleaning apparatus 20. In addition, the moving cleaning apparatus 10 may acquire air pollution level change information indicating an increase or decrease in the air pollution level for each of at least one exception region, based on the air pollution level measured in at least one exception region at a certain period or at each event occurrence. The moving cleaning apparatus 10 may generate an air pollution level distribution map of the indoor space including the air pollution level change information of the indoor space by using the air pollution level change information for each of at least one exception region and the air pollution level change information acquired from the air cleaning apparatus 20.

When the air pollution level distribution map of the indoor space is generated, the moving cleaning apparatus 10 may transmit the air pollution level distribution map including the generated air pollution level change information of the indoor space to an external apparatus (e.g., the terminal apparatus 30 or the air cleaning apparatus 20) connected to the moving cleaning apparatus 10.

FIG. 3C is a flowchart of a method in which the moving cleaning apparatus 10 operates in a second quick sensing mode according to an embodiment.

Referring to FIG. 3C, the moving cleaning apparatus 10 may acquire a quick sensing request signal for quickly detecting an air pollution level of the indoor space while prestoring the position information of the air cleaning apparatus 20 and/or the air pollution level around the air cleaning apparatus 20 in operation 321.

Upon acquiring the request signal, the moving cleaning apparatus 10 may acquire an air pollution level while moving to at least one exception region of the indoor space except a region where the air cleaning apparatus 20 is arranged in operation 322.

Upon acquiring the air pollution level, the moving cleaning apparatus 10 may generate an air pollution level distribution map including air pollution level distribution information for the exception region in operation 323. In this case, the air pollution level distribution information may include the air pollution level of each of at least one exception region.

When an air pollution level distribution map of the indoor space is acquired for at least one exception region, the moving cleaning apparatus 10 may generate an air pollution level distribution map of the indoor space by using the air pollution level distribution map and the air pollution level acquired from the air cleaning apparatus 20 in operation 324.

When the air pollution level distribution map of the indoor space is generated, the moving cleaning apparatus 10 may transmit the generated air pollution level distribution map to an external apparatus (e.g., the terminal apparatus 30 or the air cleaning apparatus 20) connected to the moving cleaning apparatus 10 in operation 325.

The moving cleaning apparatus 10 may acquire a quick sensing request signal while prestoring the position information of the air cleaning apparatus 20 and the air pollution level change information around the air cleaning apparatus 20. When the request signal is acquired, the air pollution level change information indicating an increase or decrease in the air pollution level for each of at least one exception region may be acquired. The moving cleaning apparatus 10 may generate an air pollution level distribution map of the indoor space including the air pollution level change information of the indoor space by using the air pollution level change information for each of at least one exception region and the air pollution level change information acquired from the air cleaning apparatus 20.

When the air pollution level distribution map of the indoor space is generated, the moving cleaning apparatus 10 may transmit the air pollution level distribution map including the generated air pollution level change information of the indoor space to an external apparatus (e.g., the terminal apparatus 30 or the air cleaning apparatus 20) connected to the moving cleaning apparatus 10.

FIG. 3D is a flowchart of a method in which the moving cleaning apparatus 10 operates in a cleaning mode according to an embodiment.

Referring to FIG. 3D, operations 331, 332, 333, and 334 in which the moving cleaning apparatus 10 generates the air pollution level distribution map according to the sensing request of the air pollution level may correspond to operations 301, 302, 303, and 304 of FIG. 3A, respectively, described above, and thus redundant descriptions thereof are omitted here.

Based on the transmission of the air pollution level distribution map, the moving cleaning apparatus 10 may acquire a request signal for requesting to set a cleaning mode for each region of the indoor space in operation 335. For example, as a user input for requesting to set the cleaning mode is performed through a UI provided in the moving cleaning apparatus 10, the moving cleaning apparatus 10 may acquire a user input signal corresponding to the user input as the request signal. Alternatively, as a user input for requesting to set the cleaning mode is performed through a control application of the moving cleaning apparatus 10 provided in the terminal apparatus 30, the moving cleaning apparatus 10 may acquire a user input signal corresponding to the user input as the request signal from the terminal apparatus 30.

The moving cleaning apparatus 10 may determine a cleaning mode for each region of the indoor space by considering the region-by-region air pollution level of the indoor space in operation 336. For example, the moving cleaning apparatus 10 may determine the cleaning mode in which at least one of the region-by-region dust inhalation strength of the indoor space, the movement speed, or the movement order is determined.

When the cleaning mode is determined for each region of the indoor space, the moving cleaning apparatus 10 may perform a cleaning operation while changing the cleaning mode for each region of the indoor space according to the determined cleaning mode while moving in the indoor space in operation 337. The moving cleaning apparatus 10 may perform cleaning in the order of, for example, from the region with the highest air pollution level to the region with the lowest air pollution level. Alternatively, the moving cleaning apparatus 10 may operate to increase the dust inhalation strength of a region with a high air pollution level and decrease the dust inhalation strength of a region with a low air pollution level.

FIGS. 4A, 4B, 4C, and 4D are flowcharts of methods of a terminal apparatus according to embodiments.

Figure 4A:
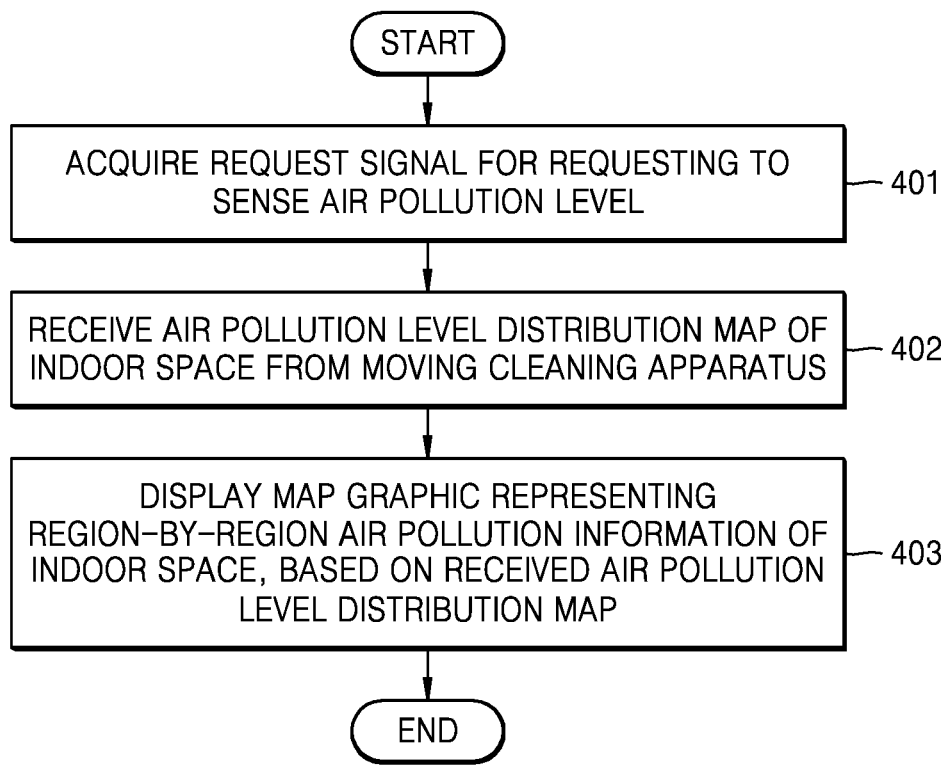
FIG. 4A is a flowchart of a method in which a terminal apparatus operates in a basic mode according to an embodiment.
Figure 4B:
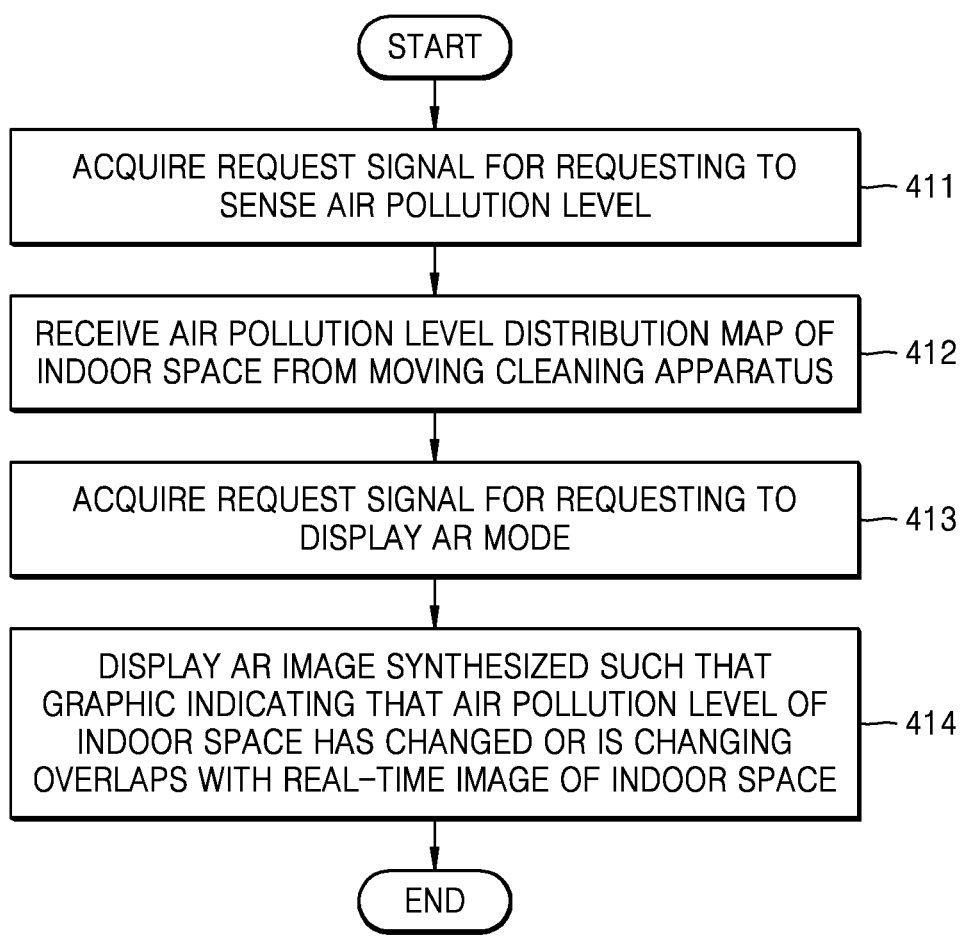
FIG. 4B is a flowchart of a method in which a terminal apparatus operates in an augmented reality (AR) mode according to an embodiment.
Figure 4C:
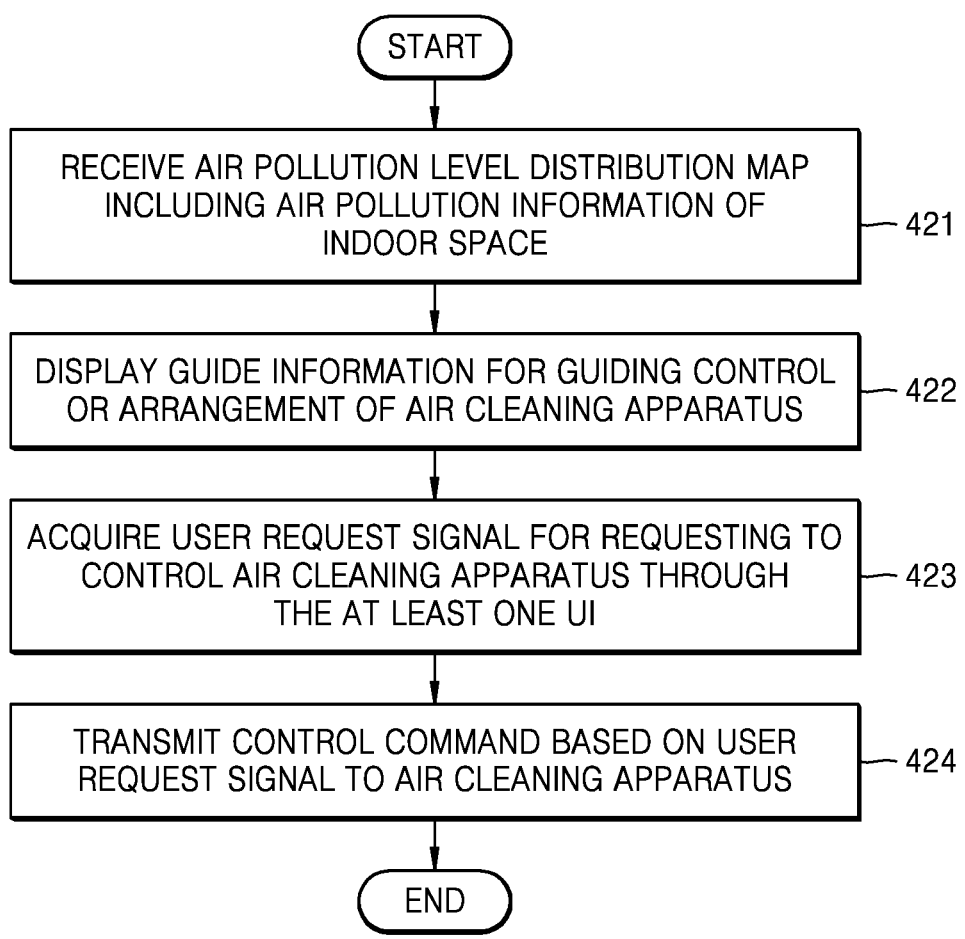
FIG. 4C is a flowchart of a method in which a terminal apparatus controls an air cleaning apparatus according to an embodiment.
Figure 4D:
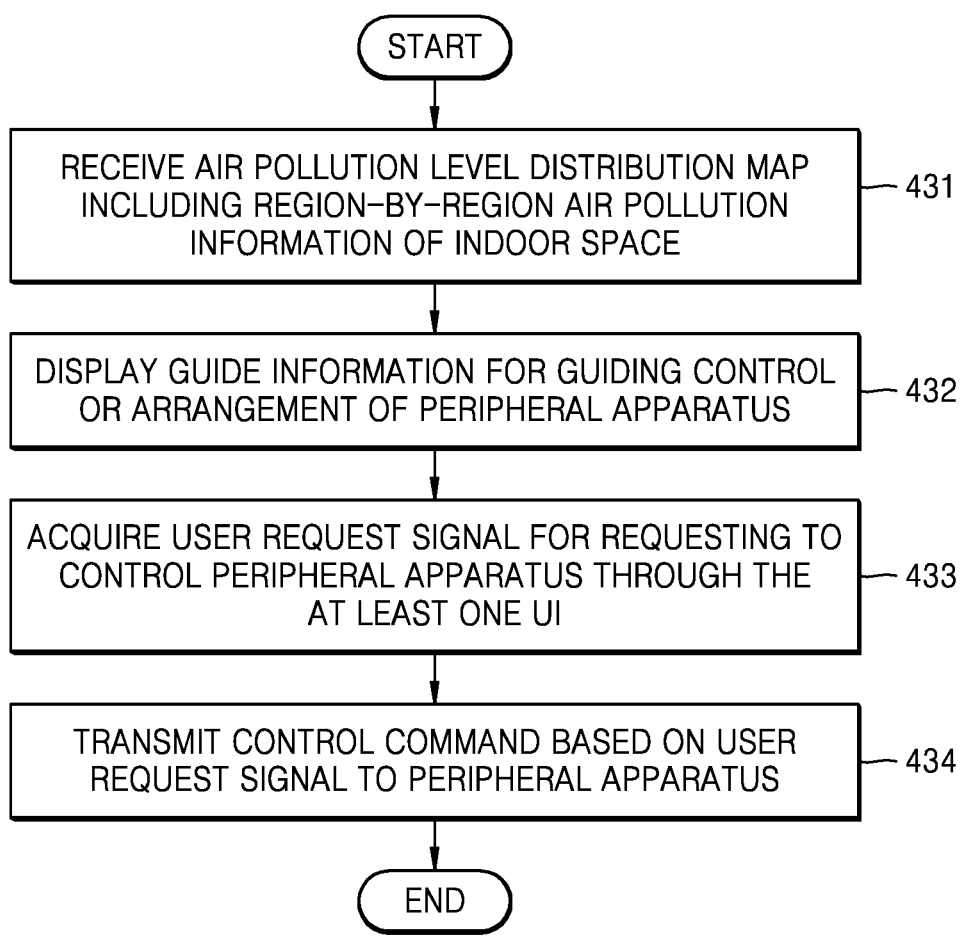
FIG. 4D is a flowchart of a method in which a terminal apparatus controls a peripheral apparatus according to an embodiment.

FIG. 4A is a flowchart of a method of an operation of the terminal apparatus 30 in a basic mode, FIG. 4B is a flowchart of a method of an operation of the terminal apparatus 30 in an AR mode, FIG. 4C is a flowchart of a method of an operation of the terminal apparatus 30 to control the air cleaning apparatus 20, and FIG. 4D is a flowchart of a method of an operation of the terminal apparatus 30 to control a peripheral apparatus.

Referring to FIG. 4A, the terminal apparatus 30 may acquire a request signal for requesting to sense the air pollution level in operation 401. For example, as a user input for requesting to sense the air pollution level is performed through an air pollution level display application provided in the terminal apparatus 30, the terminal apparatus 30 may acquire a user input signal corresponding to the user input as the request signal.

Upon acquiring the request signal, the terminal apparatus 30 may request the moving cleaning apparatus 10 to sense the air pollution level and receive an air pollution level distribution map of the indoor space including the air pollution information of the indoor space from the moving cleaning apparatus 10 in operation 402. The air pollution information may include, for example, at least one of the region-by-region air pollution level of the indoor space or the region-by-region air pollution level change information of the indoor space.

For example, the moving cleaning apparatus 10 may generate the air pollution level distribution map through the above process of FIGS. 3A to 3C and transmit the generated air pollution level distribution map to the terminal apparatus 30.

Based on the received air pollution level distribution map, the terminal apparatus 30 may display a map graphic representing the region-by-region air pollution information of the indoor space in operation 403.

FIG. 4B is a flowchart of a method in which the terminal apparatus 30 operates in an AR mode according to an embodiment.

Referring to FIG. 4B, the terminal apparatus 30 may acquire a request signal for requesting to sense the air pollution level in operation 411.

Upon acquiring the request signal, the terminal apparatus 30 may request the moving cleaning apparatus 10 to sense the air pollution level and receive an air pollution level distribution map of the indoor space including the air pollution information of the indoor space from the moving cleaning apparatus 10 in operation 412.

The terminal apparatus 30 may acquire a request signal for requesting to display an AR mode in operation 413. For example, as a user input for requesting to display the AR mode is performed through an air pollution level display application provided in the terminal apparatus 30, the terminal apparatus 30 may acquire a user input signal corresponding to the user input as the request signal.

Upon acquiring the request signal, the terminal apparatus 30 may acquire a real-time image of at least one region of the indoor space.

Based on the air pollution level distribution map and the real-time image, the terminal apparatus 30 may display an AR image synthesized such that a graphic indicating that the air pollution level of the indoor space has changed or is changing overlaps with a real-time image of the indoor space in operation 414.

FIG. 4C is a flowchart of a method in which the terminal apparatus 30 controls the air cleaning apparatus 20 according to an embodiment.

Referring to FIG. 4C, the terminal apparatus 30 may receive the air pollution level distribution map including the region-by-region air pollution information of the indoor space from the moving cleaning apparatus 10 in operation 421. In addition, the terminal apparatus 30 may acquire and store the position information of at least one air cleaning apparatus 20 in the indoor space. The position information of the air cleaning apparatus 20 may be received from the moving cleaning apparatus 10 or the air cleaning apparatus 20. Alternatively, the position information of the air cleaning apparatus 20 may be acquired from a home server that manages/operates the apparatuses in the indoor space.

The terminal apparatus 30 may display a screen including guide information for guiding the arrangement or operation of the at least one air cleaning apparatus 20, based on the air pollution level distribution map and the position information of at least one air cleaning apparatus 20.

For example, the terminal apparatus 30 may display guide information for guiding the control or arrangement of the air cleaning apparatus 20 in operation 422. The guide information may include the region-by-region air pollution information of the indoor space, a graphic representing the position of at least one air cleaning apparatus 20 in the indoor space, and at least one UI for controlling the air cleaning apparatus 20. In this case, at least one of the graphics representing the position of the air cleaning apparatus 20 or the UI for controlling the air cleaning apparatus 20 may be displayed overlapping with the AR image of operation 414 of FIG. 4B. In addition, at least one of the graphics representing the position of the air cleaning apparatus 20 or the UI for controlling the air cleaning apparatus 20 may be displayed on a separate screen. Furthermore, when the graphic representing the position of the air cleaning apparatus 20 is selected, the UI for controlling the air cleaning apparatus 20 may be displayed on a pop-up screen or a separate screen. The UI for controlling the air cleaning apparatus 20 may be, for example, a UI for setting at least one of the on/off, air current speed, air current amount, air current direction, or operation time of the air cleaning apparatus 20. The user may operate at least one UI for controlling the air cleaning apparatus 20 by referring to the air pollution level of the indoor space included in the AR image. Alternatively, the user may operate at least one UI for controlling the air cleaning apparatus 20 by referring to the air pollution level change information of the indoor space included in the AR image.

The terminal apparatus 30 may acquire a user request signal for requesting to control the air cleaning apparatus 20 through the at least one UI in operation 423. Upon acquiring the request signal, the terminal apparatus 30 may acquire a control command for controlling an operation of at least one air cleaning apparatus 20 to supply clean air to a polluted region among the regions of the indoor space. For example, the terminal apparatus 30 may generate and acquire a control command for controlling the operation of the air cleaning apparatus 20 based on the user request signal or may retrieve and acquire a control command corresponding to the user request signal from a prestored matching table.

The terminal apparatus 30 may transmit a control command based on the user request signal to the air cleaning apparatus 20 in operation 424.

The terminal apparatus 30 may display, on the screen, guide information for guiding the position where the air cleaning apparatus 20 is to be arranged. For example, the terminal apparatus 30 may propose to move the air cleaning apparatus 20 to a particular position or may display, on the screen, guide information for proposing to adjust the direction in which the airflow is discharged from the air cleaning apparatus 20.

Alternatively, the terminal apparatus 30 may display guide information related to the air cleaning apparatus 20 on the screen for each time zone. For example, the terminal apparatus 30 may display, on the screen, guide information for guiding the control or arrangement of the air cleaning apparatus 20 with discrimination between the morning, lunch, and evening times. Alternatively, the terminal apparatus 30 may display, on the screen, guide information for guiding the control or arrangement of the air cleaning apparatus 20 according to environment information (e.g., fine dust high/medium/low, spring/summer/autumn/winter, or clear/cloudy/rainy). An example of the guide information related to the air cleaning apparatus 20 is described below in greater detail with reference to FIG. 7.

FIG. 4D is a flowchart of a method in which the terminal apparatus 30 controls a peripheral apparatus according to an embodiment. The peripheral apparatus may be an apparatus capable of changing the air pollution level of the indoor space and may be, for example, a fan, an air conditioner, or the like that may change the air pollution level of the indoor space by generating airflow.

Referring to FIG. 4D, the terminal apparatus 30 may receive the air pollution level distribution map including the region-by-region air pollution information of the indoor space from the moving cleaning apparatus 10 in operation 431. In addition, the terminal apparatus 30 may acquire and store the position information of at least one peripheral apparatus in the indoor space. Alternatively, the position information of the peripheral apparatus may be received from the peripheral apparatus or may be acquired from a home server that manages/operates the apparatuses in the indoor space.

For example, the terminal apparatus 30 may display guide information for guiding the control or arrangement of the peripheral apparatus in operation 432. The guide information may include the region-by-region air pollution information of the indoor space, a graphic representing the position of the peripheral apparatus in the indoor space, and at least one UI for controlling the peripheral apparatus. In this case, at least one of the graphics representing the position of the peripheral apparatus or the UI for controlling the peripheral apparatus may be displayed overlapping with the AR image of operation 414 of FIG. 4B. In addition, at least one of the graphics representing the position of the peripheral apparatus or the UI for controlling the peripheral apparatus may be displayed on a separate screen. Furthermore, when the graphic representing the position of the peripheral apparatus is selected, the UI for controlling the peripheral apparatus may be displayed on a pop-up screen or a separate screen. The UI for controlling the peripheral apparatus may be, for example, a UI for setting at least one of the on/off, air current speed, air current amount, air current direction, or operation time of the peripheral apparatus. The user may operate at least one UI for controlling the peripheral apparatus by referring to the air pollution level of the indoor space included in the AR image. Alternatively, the user may operate at least one UI for controlling the air cleaning apparatus 20 by referring to the air pollution level change information of the indoor space included in the AR image.

The terminal apparatus 30 may acquire a user request signal for requesting to control the peripheral apparatus through the at least one UI in operation 433. Upon acquiring the request signal, the terminal apparatus 30 may transmit a control command based on the user request signal to the peripheral apparatus in operation 434.

Figure 5A:
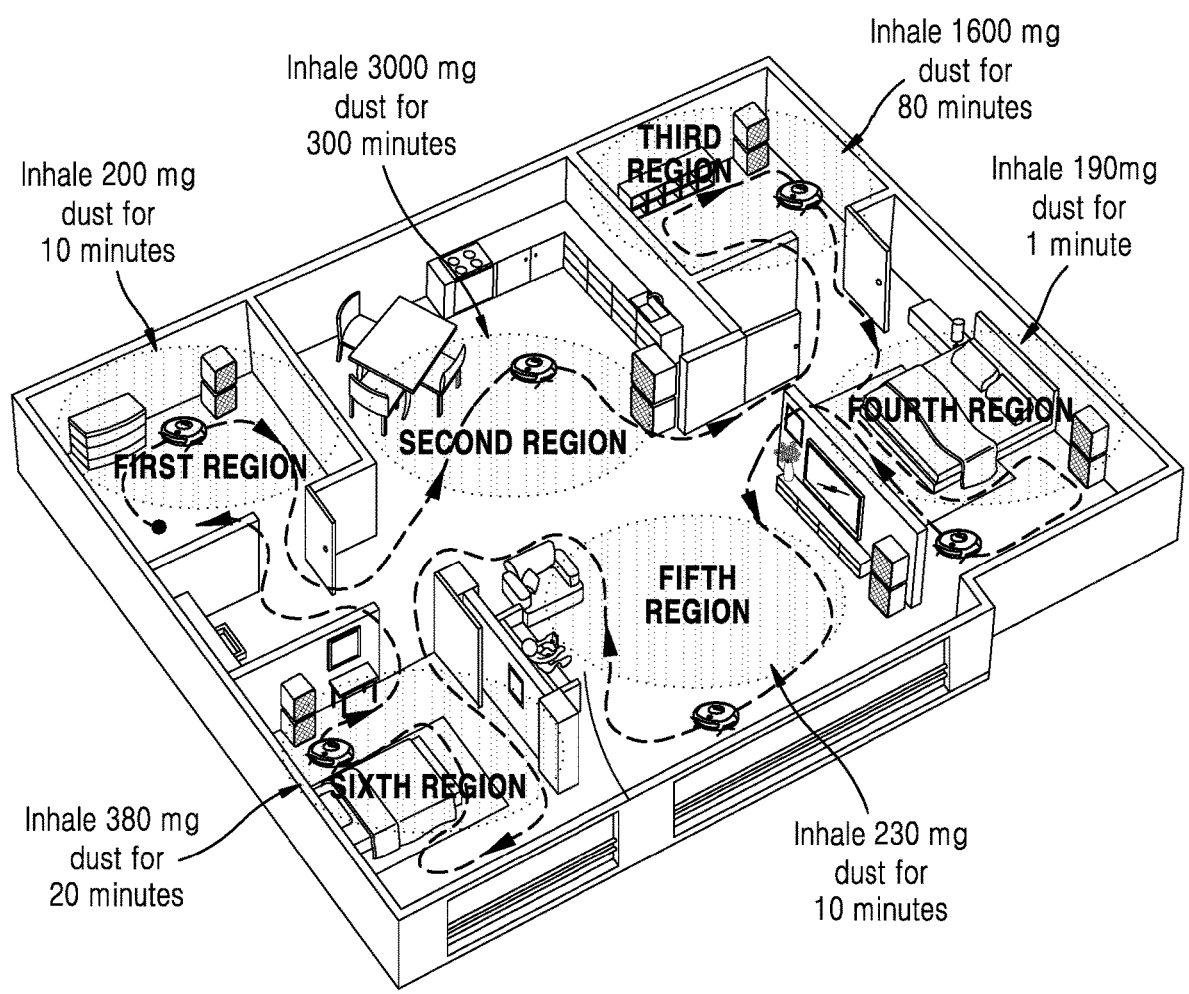
FIG. 5A is a diagram illustrating an example in which a moving cleaning apparatus acquires an air pollution level while moving in an indoor space according to an embodiment.

FIG. 5A is a diagram illustrating an example in which a moving cleaning apparatus acquires an air pollution level while moving in an indoor space according to an embodiment, and FIG. 5B is a table showing an air pollution level acquired by a moving cleaning apparatus according to an embodiment.

Referring to FIGS. 5A and 5B, the moving cleaning apparatus 10 may acquire the region-by-region air pollution level of the indoor space based on the dust inhalation amount per unit time.

For example, as illustrated in FIG. 5A, the moving cleaning apparatus 10 may acquire the air pollution level while moving from the first region to the sixth region of the indoor space.

FIG. 5B illustrates air quality information acquired while the moving cleaning apparatus 10 moves from a first region to a sixth region. The air quality information may include, for example, the dust inhalation amount, the region-by-region cleaning period, the dust inhalation amount per unit time, and the air pollution level. The moving cleaning apparatus 10 may inhale 200 mg dust for 10 minutes in the first region, inhale 3000 mg dust for 300 minutes in the second region, inhale 1600 mg dust for 40 minutes in the third region, inhale 190 mg dust for 1 minute in the fourth region, inhale 230 mg dust for 10 minutes in the fifth region, and inhale 380 mg dust for 20 minutes in the sixth region.

In FIG. 5B, when the air pollution level is determined in consideration of the dust inhalation amount, the dust inhalation amount may be determined to be highest in the second region. However, when the air pollution level is determined in consideration of the dust inhalation amount per unit time, the air pollution level of the second region may be very good (e.g., low). In addition, when the air pollution level is determined in consideration of the dust inhalation amount, the dust inhalation amount may be determined to be lowest in the fourth region. However, when the air pollution level is determined in consideration of the dust inhalation amount per unit time, the air pollution level of the fourth region may be very bad (e.g., high). That is, when the air pollution level is determined by considering the dust inhalation amount per unit time rather than by merely considering only the dust inhalation amount, a more accurate air pollution level may be acquired for each region of the indoor space.

As a result of considering the dust inhalation amount per unit time, when the air pollution level of the fourth region is determined to be worst, the moving cleaning apparatus 10 may determine the fourth region as a region requiring the highest-priority cleaning. Accordingly, the moving cleaning apparatus 10 or the terminal apparatus 30 that has acquired the region-by-region air pollution level distribution information of the indoor space may provide clean air to the fourth region or transmit a control command for discharging the polluted air of the fourth region to the air cleaning apparatus 20 of the fourth region or the peripheral apparatus (e.g., a fan or an air conditioner) of the fourth region (e.g., fan, air conditioner).

By considering the region-by-region air pollution level of the indoor space, the moving cleaning apparatus 10 or the terminal apparatus 30 may determine a region to be cleaned by using the air cleaning apparatus 20 or the peripheral apparatus or may determine a region to be cleaned by using the moving cleaning apparatus 10. For example, referring to FIG. 5B, a purifying operation or a cleaning operation is performed in descending order of the air pollution level, that is, in the order of the fourth region, the third region, the fifth region, the first region, the sixth region, and the second region.

The moving cleaning apparatus 10 may acquire the region-by-region air pollution level of the indoor space in response to a trigger signal. For example, when the air pollution level sensed by the air cleaning apparatus 20 is greater than or equal to a threshold level (e.g., fine dust level≥10 μg/m$^2$), the air cleaning apparatus 20 may transmit a request signal for acquiring the air pollution level of the indoor space to the moving cleaning apparatus 10. For example, the air cleaning apparatus 20 may transmit a request signal to the moving cleaning apparatus 10 to cause the moving cleaning apparatus 10 to acquire the air pollution level in another region except a region where the air cleaning apparatus 20 is located.

The air cleaning apparatus 20 may transmit the request signal to the moving cleaning apparatus 10 through a home gateway, a home server, or another apparatus. The air cleaning apparatus 20 may first transmit the request signal to the terminal apparatus 30 and may transmit the request signal to the moving cleaning apparatus 10 when the user accepts the transmission through the terminal apparatus 30. In addition, when transmitting the request signal, the air cleaning apparatus 20 may transmit the position information of the air cleaning apparatus 20 to the moving cleaning apparatus 10 or the terminal apparatus 30.

Figure 6:
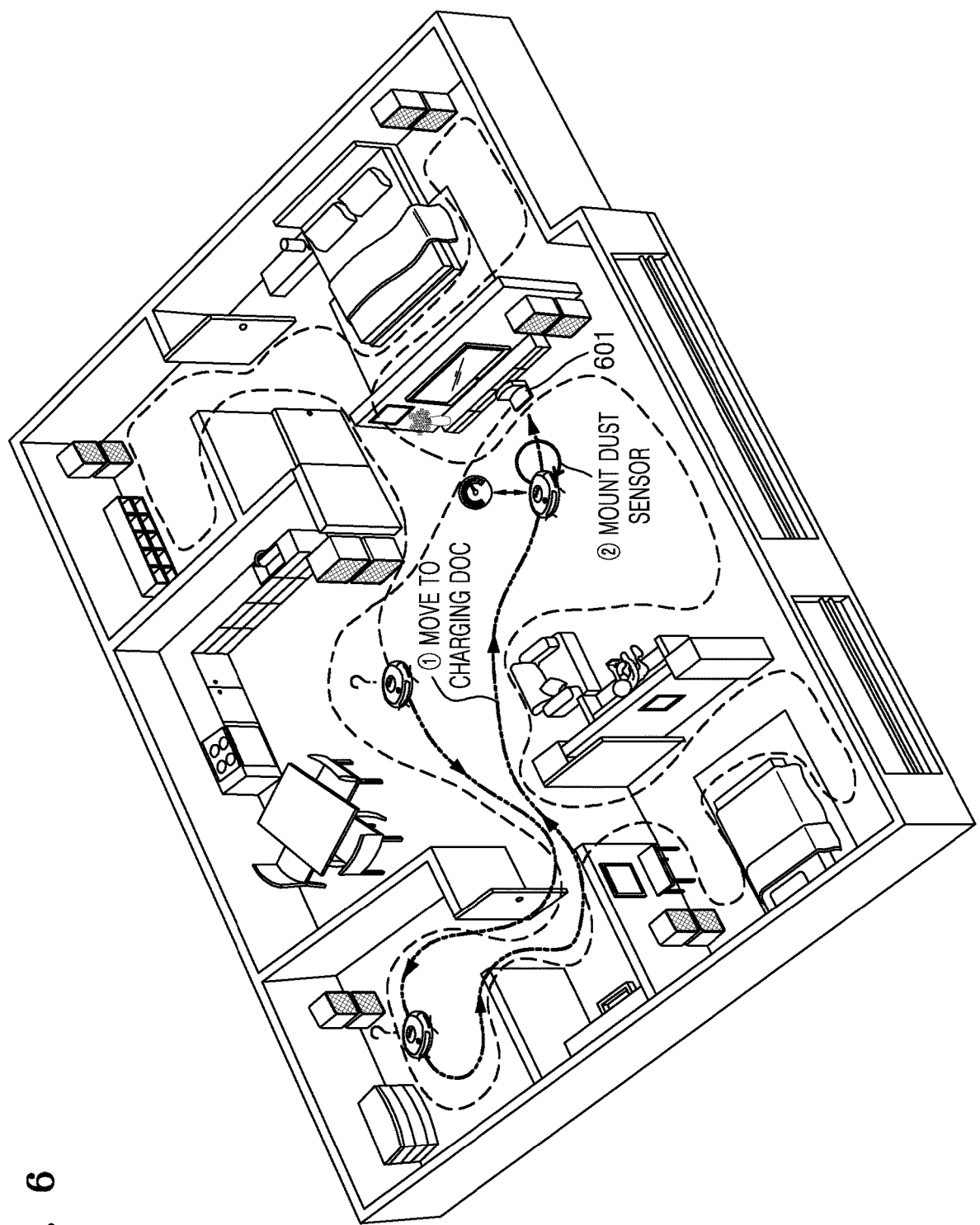
FIG. 6 is a diagram illustrating an example in which a moving cleaning apparatus mounts a dust sensor according to an embodiment.

FIG. 6 is a diagram illustrating a process in which a moving cleaning apparatus mounts a dust sensor according to an embodiment.

Referring to FIG. 6, the moving cleaning apparatus 10 may acquire the air pollution level of the indoor space by using an external dust sensor (e.g., a dust sensor provided in a charging station 601).

The moving cleaning apparatus 10 may acquire the air pollution level of the indoor space while moving in the indoor space. For example, the moving cleaning apparatus 10 may attempt to measure the air pollution level of the indoor space while performing a cleaning operation in a second region and a first region. In this case, the measurement sensitivity of the air pollution level of the indoor space may be less than or equal to a threshold value. For example, because the dust inhalation amount of the indoor space is less than or equal to a first threshold value or the dust inhalation amount of the indoor space is greater than or equal to a second threshold value, the measurement sensitivity of the air pollution level may be less than or equal to a threshold value. For example, when the measurement sensitivity of the air pollution level is determined to be less than or equal to a first threshold value, the moving cleaning apparatus 10 may move to the charging station 601 to mount the dust sensor (①). The moving cleaning apparatus 10, after moving to the charging station 601, may mount the dust sensor (or a module including the dust sensor) provided in the charging station 601 (②). The moving cleaning apparatus 10 mounted with the dust sensor may acquire the air pollution level of the indoor space while moving in the indoor space. In this case, the moving cleaning apparatus 10 may again measure the air pollution level of each region by again moving to the second region and the first region where the measurement sensitivity of the air pollution level is less than or equal to a threshold value.

Figure 7:
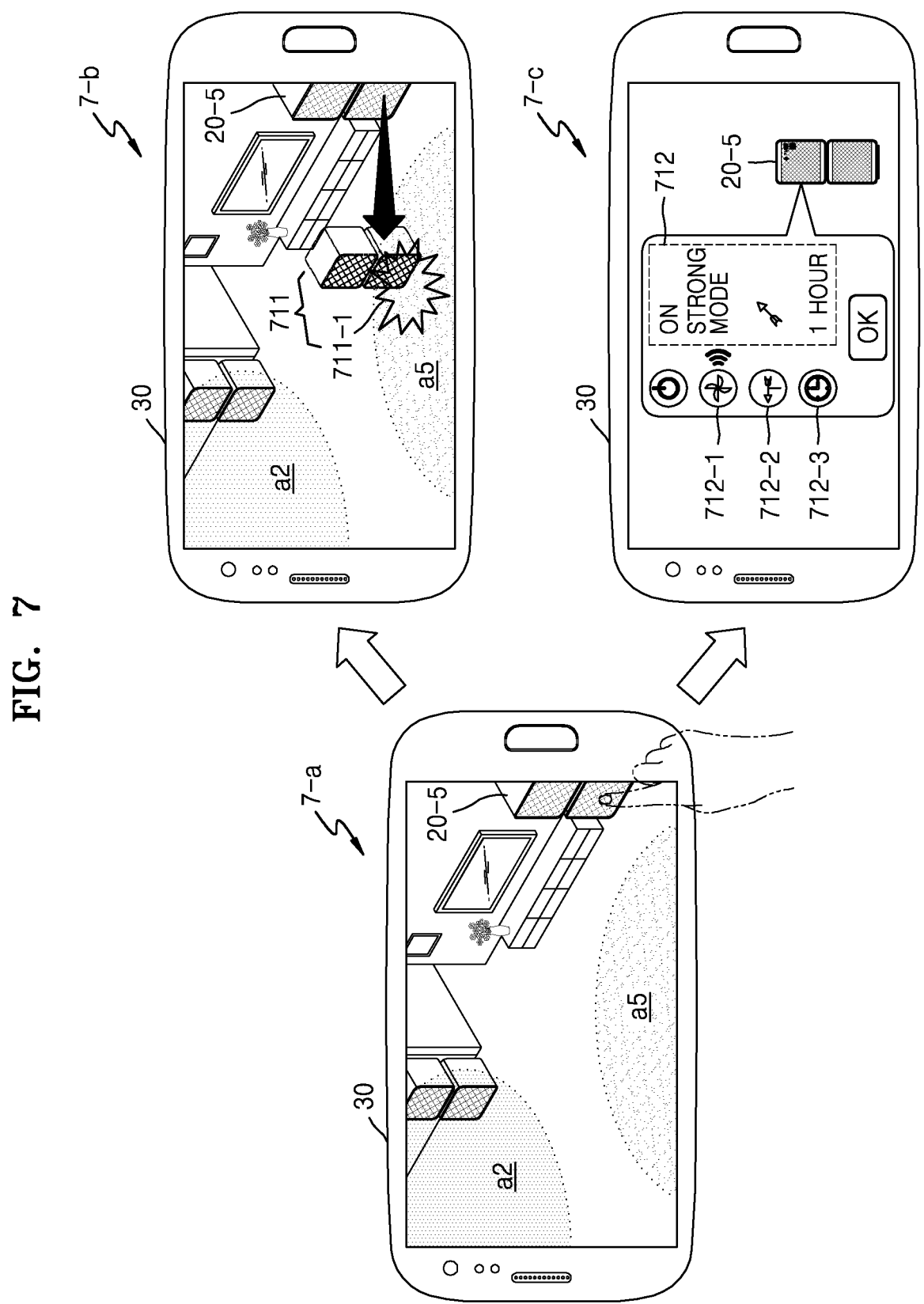
FIG. 7 is a diagram illustrating an example in which a terminal apparatus displays guide information for controlling an air cleaning apparatus through an AR image according to an embodiment.
Figure 8:
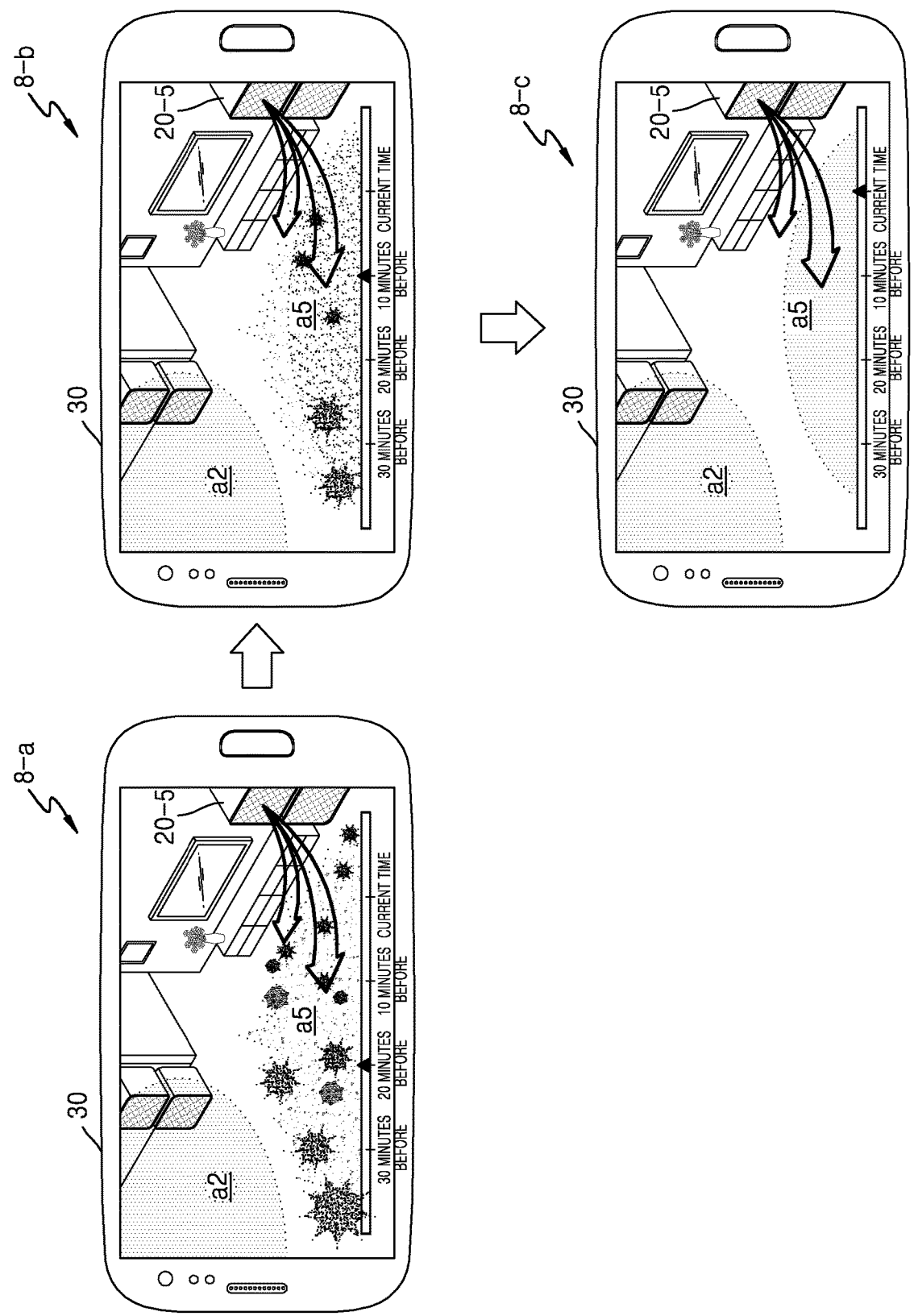
FIG. 8 is a diagram illustrating an example in which a terminal apparatus displays a situation of an air pollution level change through an AR image according to an embodiment.

FIGS. 7 and 8 are diagrams in which a terminal apparatus displays air pollution information through an AR image according to embodiments.

Referring to FIG. 7, the terminal apparatus 30 may display guide information for controlling the air cleaning apparatus 20 through an AR image.

The terminal apparatus 30, in panel 7-a, may acquire the region-by-region air pollution information of the indoor space acquired while the moving cleaning apparatus 10 moves in the indoor space. In addition, the terminal apparatus 30 may acquire a real-time image of at least one region of the indoor space. Based on the acquired air pollution information and real-time image, the terminal apparatus 30 may further include an operation of displaying an AR image synthesized such that the air pollution information overlaps with the real-time image. The air pollution information for each of the regions a2 and a5 of the indoor space and the air cleaning apparatus 20-5 included in the real-time image may be displayed. In this case, based on the position of the air cleaning apparatus 20-5, a UI for receiving a user input signal may be mapped to a position corresponding to the air cleaning apparatus 20-5 of the AR image.

When an user input signal for selecting the air cleaning apparatus 20-5 is acquired, the terminal apparatus 30, in panel 7-b, may display guide information 711 for guiding the arrangement of the air cleaning apparatus 20-5. Guide information 711, in panel 7-*b*, for requesting to move the air cleaning apparatus 20-5 to a particular point 711-1 may be displayed.

For example, when an user input signal for selecting the air cleaning apparatus 20-5 is acquired, the terminal apparatus 30, in panel 7-*c*, may display guide information for guiding the operation of the air cleaning apparatus 20-5. Guide information 712, in panel 7-*c*, for guiding an air current amount 712-1, an air current direction 712-2, and an operation time 712-3 of the air cleaning apparatus 20-5 may be displayed. In this case, when a user input signal for selecting a UI (e.g., an OK button) for accepting the guide is received, the terminal apparatus 30 may transmit a control command for controlling the operation of the air cleaning apparatus 20-5 to the air cleaning apparatus 20-5 according to the displayed guide information.

Guide information 711 and 712 for guiding the arrangement or operation of the air cleaning apparatus 20-5 capable of cleaning the fifth region a5 may be displayed based on a user input signal for selecting the fifth region a5.

Guide information 711 and 712 for guiding the arrangement or operation of the air cleaning apparatus 20-5 capable of cleaning the fifth region a5 may be displayed together with the display of an AR image according to the photographing of the fifth region a5 with a serious air pollution level.

The terminal apparatus 30 may display the above air pollution level distribution map of the indoor space instead of the AR image. In this case, the position of at least one air cleaning apparatus 20 in the indoor space may be displayed in the air pollution level distribution map. For example, an image, an icon, or a text representing the air cleaning apparatus 20 may be displayed at the position of at least one air cleaning apparatus 20 in the indoor space.

When a user input signal for selecting the air cleaning apparatus 20 in the air pollution level distribution map is acquired, the terminal apparatus 30 may display guide information for guiding the arrangement or operation of the air cleaning apparatus 20. In this case, when a user input signal for selecting a particular region in the air pollution level distribution map is acquired, the terminal apparatus 30 may identify at least one air cleaning apparatus 20 capable of cleaning the particular region and display guide information for guiding the arrangement or operation of the identified air cleaning apparatus 20.

Referring to FIG. 8, the terminal apparatus 30 may display a situation where the air pollution level changes through an AR image.

The terminal apparatus 30 may acquire the time-by-time air pollution level acquired while the moving cleaning apparatus 10 moves in the indoor space.

For example, the terminal apparatus 30 may acquire the region-by-region air pollution level of the indoor space from the moving cleaning apparatus 10 every certain period (e.g., 10 minutes).

In this case, as in panels 8-*a*, 8-*b*, and 8-*c*, the terminal apparatus 30 may display an AR image synthesized such that the air pollution level overlaps with a real-time image. In this case, the terminal apparatus 30 may display a timeline representing the measurement time of the air pollution level of the indoor space.

For example, panel 8-*a* may represent the air pollution level of the indoor space 20 minutes ago, panel 8-*b* may represent the air pollution level of the indoor space 10 minutes ago, and panel 8-*c* may represent the air pollution level of the indoor space at the current time. In this case, when the user selects a particular time in the timeline, the air pollution level of the indoor space at the corresponding time may be displayed overlapping the real-time image. Accordingly, the user may detect a process in which the region-by-region air pollution level of the indoor space changes.

Figure 9:
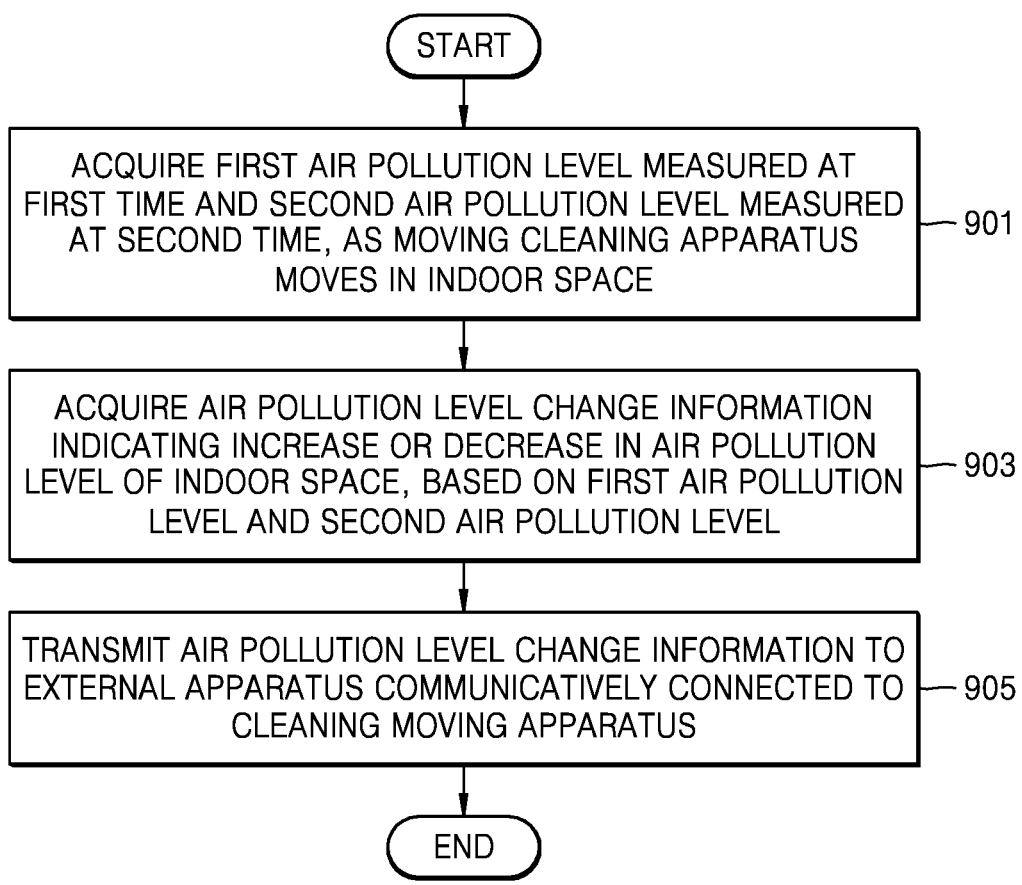
FIG. 9 is a flowchart of a method of providing information by a moving cleaning apparatus according to an embodiment.

FIG. 9 is a flowchart of a method of providing information by a moving cleaning apparatus according to an embodiment.

Referring to FIG. 9, as the moving cleaning apparatus 10 moves in the indoor space, the moving cleaning apparatus 10 may acquire a first air pollution level of the indoor space measured at a first time and a second air pollution level of the indoor space measured at a second time in operation 901. For example, the moving cleaning apparatus 10 may measure the first air pollution level and the second air pollution level based on the amount of dust drawn in by the moving cleaning apparatus 10 or the sensing value of the dust sensor provided in the moving cleaning apparatus 10. In this case, the moving cleaning apparatus 10 may acquire the first air pollution level and the second air pollution level based on the dust drawing-in amount per unit time of the moving cleaning apparatus 10.

When the measurement sensitivity of the first air pollution level or the second air pollution level measured by the moving cleaning apparatus 10 is less than or equal to a threshold value, the moving cleaning apparatus 10 may move to a charging station and mount a dust sensor provided in the charging station. Then, the moving cleaning apparatus 10 may acquire the first air pollution level and the second air pollution level based on the sensing value of the mounted dust sensor.

The moving cleaning apparatus 10 may acquire the first air pollution level and the second air pollution level in at least one exception region of the indoor space except a region where the air cleaning apparatus 20 is arranged.

The moving cleaning apparatus 10 may acquire the first air pollution level measured in one region of the indoor space at the first time and the second air pollution level measured in the same region as the one region at the second time.

When the first air pollution level and the second air pollution level are acquired in operation 901, the moving cleaning apparatus 10 may acquire the air pollution level change information indicating an increase or decrease in the air pollution level of the indoor space, based on the acquired first air pollution level and second air pollution level in operation 903. The air pollution level change information may include, for example, the air pollution level distribution information representing the region-by-region air pollution level of the indoor space. For example, when a map of the indoor space is generated as the moving cleaning apparatus 10 moves in the indoor space, the moving cleaning apparatus 10 may acquire the region-by-region air pollution level distribution information included in the generated map.

When the air pollution level change information is acquired in operation 903, the moving cleaning apparatus 10 may transmit the acquired air pollution level change information to the external apparatus communicatively connected to the moving cleaning apparatus in operation 905. The external apparatus may be, for example, the air cleaning apparatus 20 or the terminal apparatus 30.

The moving cleaning apparatus 10 may determine the region-by-region cleaning mode of the indoor space by using the air pollution level change information and perform a cleaning operation according to the determined cleaning mode.

FIG. 10 is a flowchart of a method of transmitting a control command by a terminal apparatus according to an embodiment.

Referring to FIG. 10, the terminal apparatus 30 may store the position information of at least one air cleaning apparatus 20 in the indoor space in operation 1001. The terminal apparatus 30 may acquire and store the position information of at least one air cleaning apparatus 20 in the indoor space from the air cleaning apparatus 20, the home gateway, the home server, or the moving cleaning apparatus 10.

In addition, the terminal apparatus 30 may acquire the region-by-region air pollution information of the indoor space acquired while the moving cleaning apparatus 10 moves in the indoor space in operation 1003. The region-by-region air pollution information of the indoor space may include at least one of the region-by-region air pollution level of the indoor space or the region-by-region air pollution level change information of the indoor space indicating an increase or decrease in the air pollution level of the indoor space. Furthermore, the region-by-region air pollution information of the indoor space may include the region-by-region air pollution level of the indoor space acquired based on at least one of the dust inhalation amount per unit time of the moving cleaning apparatus 10 or the sensing value per unit time of the dust sensor provided in the moving cleaning apparatus 10. Moreover, the region-by-region air pollution information of the indoor space may include the region-by-region air pollution level of the indoor space acquired based on at least one of the dust inhalation amount per unit time of the moving cleaning apparatus 10 or the sensing value per unit time of the dust sensor provided in the moving cleaning apparatus 10. In addition, the region-by-region air pollution information of the indoor space may include the region-by-region air pollution level of the indoor space measured in at least one exception region of the indoor space except a region where the air cleaning apparatus is arranged.

Based on the acquired region-by-region air pollution information of the indoor space and the position information of at least one air cleaning apparatus 20 in the indoor space, the terminal apparatus 30 may acquire a control command for controlling the operation of at least one air cleaning apparatus to supply clean air to a polluted region among the regions of the indoor space in operation 1005. In this case, the control command may be a control command for controlling at least one of the air current direction, the air current amount, the air current speed, or the operation time of at least one air cleaning apparatus.

The terminal apparatus 30 may identify the air cleaning apparatus 20 located in the polluted region, based on the position information of the air cleaning apparatus 20. The terminal apparatus 30 may acquire a control command for controlling the operation of the identified air cleaning apparatus 20. For example, the terminal apparatus 30 may generate and acquire a control command for controlling the operation of the air cleaning apparatus 20 or may retrieve and acquire a control command corresponding to the user request signal from a prestored matching table.

Alternatively, the terminal apparatus 30 may identify at least one region of the indoor space having an air pollution level greater than or equal to a certain value and acquire a control command for controlling the operation of at least one air cleaning apparatus 20 located in the identified at least one region.

Alternatively, when there are a plurality of air cleaning apparatuses 20 in the indoor space, the terminal apparatus 30 may identify a plurality of air cleaning apparatuses 20 capable of cleaning a polluted region based on the position information of a plurality of air cleaning apparatuses 20. The terminal apparatus 30 may acquire a control command for controlling the operations of the identified air cleaning apparatuses 20.

The terminal apparatus 30 may display guide information for guiding the arrangement or operation of at least one air cleaning apparatus, based on the acquired region-by-region air pollution information of the indoor space and the position information of at least one air cleaning apparatus in the indoor space. In this case, based on the displayed guide information, when a user request signal for controlling the operation of at least one air cleaning apparatus 20 is acquired, the terminal apparatus 30 may acquire, based on the user request signal, a control command for controlling the operation of at least one air cleaning apparatus 20 to supply clean air to a polluted region among the regions of the indoor space.

The terminal apparatus 30 may acquire a real-time image of at least one region of the indoor space. The terminal apparatus 30 may display an AR image synthesized such that the air pollution information of the at least one region overlaps with the real-time image, based on the air pollution information and the acquired real-time image. In this case, the guide information for guiding the arrangement or operation of at least one air cleaning apparatus may be displayed in the AR image. In this case, based on the displayed guide information, when a user request signal for controlling the operation of at least one air cleaning apparatus 20 is acquired, the terminal apparatus 30 may acquire, based on the user request signal, a control command for controlling the operation of at least one air cleaning apparatus 20 to supply clean air to a polluted region among the regions of the indoor space.

When the control command for controlling the operation of the air cleaning apparatus 20 is acquired, the terminal apparatus 30 may transmit the acquired control command to at least one air cleaning apparatus 20 in operation 1007. At least one air cleaning apparatus 20 may operate based on the received control command. For example, at least one of the air current direction, air current amount, air current speed, or operation time of at least one air cleaning apparatus 20 may be controlled.

Based on the position information of the terminal apparatus 30, the moving cleaning apparatus 10 may determine whether the current position of the terminal apparatus 30 is in the indoor space. When the position of the terminal apparatus 30 is determined not to be in the indoor space, the moving cleaning apparatus 10 may provide the region-by-region air pollution information of the indoor space to another terminal apparatus (e.g., a digital TV of the living room or the display apparatus 40 of FIG. 1A). In this case, the other terminal apparatus may display guide information for guiding the arrangement or operation of at least one air cleaning apparatus, based on the acquired region-by-region air pollution information of the indoor space and the position information of at least one air cleaning apparatus 20 in the indoor space. In this case, the position information of at least one air cleaning apparatus 20 may be stored in the other terminal apparatus or may be received from the moving cleaning apparatus 10 together with the region-by-region air pollution information of the indoor space. The other terminal apparatus may display the guide information on the display of the other terminal apparatus. For example, the other terminal apparatus may display the guide information in the state of operating in an ambient mode. Alternatively, when the user is viewing the content provided by the other terminal apparatus, the other terminal apparatus may display the guide information in the form of a pop-up message or a notification message.

When a home gateway receives the region-by-region air pollution information of the indoor space requested to be transmitted to the terminal apparatus 30 from the moving cleaning apparatus 10, the home gateway may determine whether the current position of the terminal apparatus 30 is in the indoor space. When the position of the terminal apparatus 30 is determined to be in the indoor space, the home gateway may transmit the region-by-region air pollution information of the indoor space to the terminal apparatus 30. On the other hand, when the position of the terminal apparatus 30 is determined to not be in the indoor space, the home gateway may provide the region-by-region air pollution information of the indoor space to another terminal apparatus (e.g., a digital TV of the living room or the display apparatus 40 of FIG. 1A). Upon receiving the air pollution information, the other terminal apparatus may display the guide information on the display of the other terminal apparatus.

The position information of at least one air cleaning apparatus 20 may be currently stored in the home gateway. In this case, at the request of the terminal apparatus 30 or the other terminal apparatus (e.g., the display apparatus 40 of FIG. 1A), the home gateway may provide the position information of at least one air cleaning apparatus 20 stored in the home gateway to the terminal apparatus 30 or the other terminal apparatus. Based on the region-by-region air pollution information of the indoor space and the position information of at least one air cleaning apparatus in the indoor space, the terminal apparatus 30 or the other terminal apparatus may acquire a control command for controlling the operation of at least one air cleaning apparatus to supply clean air to a polluted region among the regions of the indoor space. Then, the terminal apparatus 30 or the other terminal apparatus may transmit the acquired control command to the at least one air cleaning apparatus. Alternatively, the terminal apparatus 30 or the other terminal apparatus may display guide information for guiding the arrangement or operation of at least one air cleaning apparatus 20, based on the region-by-region air pollution information of the indoor space and the position information of at least one air cleaning apparatus 20 in the indoor space.

The terms "module" and "unit" used herein may include a unit implemented as hardware, software, or firmware and may be interchangeable with, for example, terms such as "logic," "logical block," "component," or "circuit". The term "module" may indicate an integrated component or a portion or a minimum unit of the integrated component that performs one or more functions. For example, a module may be implemented in the form of an application-specific integrated circuit (ASIC).

The various embodiments of the disclosure may be implemented as software (or programs) including one or more instructions stored in a storage medium that may be readable by a machine (e.g., the moving cleaning apparatus 10, the air cleaning apparatus 20, or the terminal apparatus 30). For example, the machine (e.g., the moving cleaning apparatus 10, the air cleaning apparatus 20, or the terminal apparatus 30) may call and execute at least one of the stored one or more instructions from the storage medium. This may enable the machine to be operated to perform at least one function according to the called at least one instruction. The one or more instructions may include code generated by a compiler or code executable by an interpreter. The machine-readable storage medium may be provided in the form of a non-transitory storage medium. Here, the term "non-transitory" may indicate that the storage medium is a tangible apparatus and does not include signals (e.g., electromagnetic waves), and may indicate that data may be permanently or temporarily stored in the storage medium.

A method according to various embodiments of the disclosure may be included and provided in a computer program product. The computer program product may be traded as a product between a seller and a buyer. The computer program product may be distributed in the form of a storage medium (e.g., a compact disk read-only memory (CD-ROM)) readable by a computer (e.g., a PC, a server, the moving cleaning apparatus 10, the air cleaning apparatus 20, or the terminal apparatus 30 or may be distributed (e.g., downloaded or uploaded) online directly between two user apparatuses (e.g., smart phones) or through an application store (e.g. PlayStore™). In the case of online distribution, at least a portion of the computer program product may be at least temporarily stored or temporarily generated in a storage medium readable by a machine such as a manufacturer's server, a server of an application store, or a memory of a relay server.

Each component (e.g., a module or a program) of the above components may include a single entity or a plurality of entities. One or more components or operations among the above components may be omitted, or one or more other components or operations may be added. Alternatively or additionally, a plurality of components (e.g., modules or programs) may be integrated into one component. In this case, the integrated component may perform one or more functions of each component of the plurality of components in the same or similar manner as those performed by the corresponding component among the plurality of components prior to the integration. Operations performed by modules, programs, or other components may be executed sequentially, parallel, iteratively, or heuristically; one or more of the operations may be executed in different order; or one or more other operations may be added therein.

According to the disclosure, an optimal operation and arrangement of the air cleaning apparatus may be achieved and thus the efficiency of the air cleaning apparatus may be greatly improved. Particularly, the moving cleaning apparatus may accurately acquire the region-by-region air pollution information of the indoor space while moving in each indoor space, and the entire indoor space may be kept uniformly clean according to the operation of the air cleaning apparatus reflecting the region-by-region air pollution information.

In addition, when the guide information for guiding the arrangement or operation of the air cleaning apparatus is displayed on the terminal apparatus, the user may operate or arrange the air cleaning apparatus by considering the air pollution information of the indoor space. Particularly, when the air pollution level is displayed on the terminal apparatus based on the augmented reality (AR), the user may easily detect the air pollution situation of the indoor space and control the air cleaning apparatus.

In addition, various other effects may also be directly or indirectly understood and provided through the disclosure.

While the disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:

1. A method of transmitting a control command of a terminal apparatus, the method comprising:

storing, by the terminal apparatus, position information of at least one air cleaning apparatus in an indoor space;

acquiring, by the terminal apparatus, from a moving cleaning apparatus through a wireless communicator, region-by-region air pollution information of the indoor space acquired while the moving cleaning apparatus moves in the indoor space;

acquiring, through a camera of the terminal apparatus, a real-time image of the at least one region of the indoor space;

displaying, by the terminal apparatus, based on the acquired region-by-region air pollution information of the indoor space, the position information of the at least one air cleaning apparatus in the indoor space and the real-time image, an augmented reality (AR) image synthesized such that air pollution information of the at least one region overlaps with the real-time image;

displaying, in response to a user input signal for selecting the at least one air cleaning apparatus of the AR image, guide information for suggesting a change in a position of the at least one air cleaning apparatus based on the acquired region-by-region air pollution information of the indoor space and the position information of the at least one air cleaning apparatus in the indoor space, wherein the guide information is displayed on the AR image;

acquiring, in response to the acquired region-by-region air pollution information of the indoor space and the position information of the at least one air cleaning apparatus in the indoor space, a control command for controlling an operation of the at least one air cleaning apparatus to supply clean air to a polluted region among regions of the indoor space; and transmitting, by the terminal apparatus, the acquired control command to the at least one air cleaning apparatus.

2. The method of claim 1, wherein the guide information further comprises information for guiding an operation of the at least one air cleaning apparatus.

3. The method of claim 2, further comprising:
acquiring, based on the displayed guide information, a user request signal for controlling an operation of the at least one air cleaning apparatus,
wherein acquiring the control command includes acquiring, based on the user request signal, a control command for controlling an operation of the at least one air cleaning apparatus to supply clean air to the polluted region among the regions of the indoor space.

4. The method of claim 2, wherein the guide information includes at least one of the region-by-region air pollution information of the indoor space, a graphic representing a position of the at least one air cleaning apparatus in the indoor space, or at least one user interface (UI) for controlling the at least one air cleaning apparatus.

5. The method of claim 1, wherein the region-by-region air pollution information of the indoor space includes at least one of a region-by-region air pollution level of the indoor space or region-by-region air pollution level change information of the indoor space, wherein the region-by-region air pollution level change information indicates an increase or decrease in the air pollution level of the indoor space.

6. The method of claim 1, wherein the control command for controlling the operation of the at least one air cleaning apparatus controls at least one of an air current direction, an air current amount, an air current speed, or an operation time of the at least one air cleaning apparatus.

7. The method of claim 1, wherein the region-by-region air pollution information of the indoor space includes a region-by-region air pollution level of the indoor space acquired based on at least one of an amount of dust drawn in by the moving cleaning apparatus or a sensing value of a dust sensor provided in the moving cleaning apparatus.

8. The method of claim 1, wherein the region-by-region air pollution information of the indoor space includes a region-by-region air pollution level of the indoor space acquired based on at least one of a dust drawn-in amount per unit time of the moving cleaning apparatus or a sensing value per unit time of a dust sensor provided in the moving cleaning apparatus.

9. The method of claim 1, wherein the region-by-region air pollution information of the indoor space includes a region-by-region air pollution level of the indoor space measured in at least one region of the indoor space except a region where the air cleaning apparatus is arranged.

10. A terminal apparatus, comprising:
a display;
a wireless communicator configured to communicate with an external apparatus;
at least one processor electrically connected to the communicator; and
a memory electrically connected to the at least one processor and configured to store position information of at least one air cleaning apparatus in an indoor space,
wherein the memory is further configured to store at least one instruction set to, when executed by the at least one processor, instruct the at least one processor to:
acquire, from a moving cleaning apparatus through the wireless communicator, region-by-region air pollution information of the indoor space acquired while a moving cleaning apparatus moves in the indoor space;
acquire, through a camera of the terminal apparatus, a real-time image of the at least one region of the indoor space;
control the display, based on the acquired region-by-region air pollution information of the indoor space, the real-time image, and the position information of the at least one air cleaning apparatus in the indoor space, to display an augmented reality (AR) image synthesized such that air pollution information of the at least one region overlaps with the real-time image;
control the display to display, in response to a user input signal for selecting the at least one air cleaning apparatus of the AR image, guide information for suggesting a change in a position of the at least one air cleaning apparatus based on the acquired region-by-region air pollution information of the indoor space and the position information of the at least one air cleaning apparatus in the indoor space, wherein the guide information is displayed on the AR image;
acquire, in response to the acquired region-by-region air pollution information of the indoor space and the position information of the at least one air cleaning apparatus in the indoor space, a control command for controlling an operation of the at least one air cleaning apparatus to supply clean air to a polluted region among regions of the indoor space; and
control the communicator to transmit the acquired control command to the at least one air cleaning apparatus.

11. The terminal apparatus of claim 10, wherein the guide information further comprises information for guiding an operation of the at least one air cleaning apparatus.

12. The terminal apparatus of claim 11, wherein the memory is further configured to store at least another instruction set to, when executed by the at least one processor, instruct the at least one processor to:

acquire, based on the displayed guide information, a user request signal for controlling an operation of the at least one air cleaning apparatus; and acquire, based on the user request signal, a control command for controlling an operation of the at least one air cleaning apparatus to supply the clean air to the polluted region among the regions of the indoor space.

13. The terminal apparatus of claim 11, wherein the guide information includes at least one of the region-by-region air pollution information of the indoor space, a graphic representing a position of the at least one air cleaning apparatus in the indoor space, or at least one user interface (UI) for controlling the at least one air cleaning apparatus.

14. The terminal apparatus of claim 10, wherein the region-by-region air pollution information of the indoor space includes at least one of a region-by-region air pollution level of the indoor space or region-by-region air pollution level change information of the indoor space, the region-by-region air pollution level change information indicating an increase or decrease in the air pollution level of the indoor space.

15. The terminal apparatus of claim 10, wherein the control command for controlling the operation of the at least one air cleaning apparatus controls at least one of an air current direction, an air current amount, an air current speed, or an operation time of the at least one air cleaning apparatus.

16. The terminal apparatus of claim 10, wherein the region-by-region air pollution information of the indoor space includes a region-by-region air pollution level of the indoor space acquired based on at least one of an amount of dust drawn in by the moving cleaning apparatus or a sensing value of a dust sensor provided in the moving cleaning apparatus.

17. The terminal apparatus of claim 10, wherein the region-by-region air pollution information of the indoor space includes a region-by-region air pollution level of the indoor space acquired based on at least one of a dust drawn-in amount per unit time of the moving cleaning apparatus or a sensing value per unit time of a dust sensor provided in the moving cleaning apparatus.

18. A computer program product comprising a non-transitory computer-readable storage medium comprising at least one instruction set to:

acquire, from a moving cleaning apparatus through a wireless communicator, region-by-region air pollution information of an indoor space acquired while the moving cleaning apparatus moves in the indoor space;

acquire, through a camera, a real-time image of the at least one region of the indoor space;

display, based on the acquired region-by-region air pollution information of the indoor space and a position information of at least one air cleaning apparatus in the indoor space and the real-time image, an augmented reality (AR) image synthesized such that air pollution information of the at least one region overlaps with the real-time image;

display, in response to a user input signal for selecting the at least one air cleaning apparatus of the AR image, guide information for suggesting a change in a position of the at least one air cleaning apparatus based on the acquired region-by-region air pollution information of the indoor space and the position information of the at least one air cleaning apparatus in the indoor space, wherein the guide information is displayed on the AR image;

acquire, in response to the acquired region-by-region air pollution information of the indoor space and position information of the at least one air cleaning apparatus in the indoor space, a control command for controlling an operation of at least one air cleaning apparatus to supply clean air to a polluted region among regions of the indoor space; and transmit, through the wireless communicator, the acquired control command to the at least one air cleaning apparatus.

* * * * *